United States Patent
Massoud et al.

(10) Patent No.: US 11,768,274 B2
(45) Date of Patent: Sep. 26, 2023

(54) PREAMBLE PULSE BASED LIDAR SYSTEMS AND METHODS

(71) Applicant: HUAWEI TECHNOLOGIES CO., LTD., Guangdong (CN)

(72) Inventors: Ali Ahmed Ali Massoud, Kanata (CA); Zhiping Jiang, Kanata (CA); Haitao Sun, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 516 days.

(21) Appl. No.: 16/921,174

(22) Filed: Jul. 6, 2020

(65) Prior Publication Data

US 2022/0003846 A1    Jan. 6, 2022

(51) Int. Cl.
*G01S 7/481*    (2006.01)
*G01S 17/10*    (2020.01)
(Continued)

(52) U.S. Cl.
CPC ............ *G01S 7/4817* (2013.01); *G01S 7/486* (2013.01); *G01S 7/4814* (2013.01);
(Continued)

(58) Field of Classification Search
CPC .... G01S 7/4817; G01S 17/931; G01S 7/4814; G01S 7/4816; G01S 7/486; G01S 17/10;
(Continued)

(56) References Cited

U.S. PATENT DOCUMENTS 4,657,382 A    4/1987    Busujima et al.
6,278,961 B1 *  8/2001    Kadtke ................ G06K 9/6217
                                                    703/2
(Continued)

FOREIGN PATENT DOCUMENTS

CN    110383106 A    10/2019
CN    110612456 A    12/2019
(Continued)

OTHER PUBLICATIONS

"Australian/New Zealand Standard: Safety of laser products Part 1: Equipment classification and requirements", Standards Australia Limited/Standards New Zealand, Sydney, 2014 (Year: 2014).*

(Continued)

*Primary Examiner* — Isam A Alsomiri
*Assistant Examiner* — Joseph C Fritchman
(74) *Attorney, Agent, or Firm* — BCF LLP

(57) ABSTRACT

The disclosed systems, structures, and methods are directed to a LiDAR system comprising a radiation source configured to emit light pulses towards a region of interest (ROI), a detector configured to detect light pulses reflected from the ROI, a processor, communicatively coupled to the radiation source and the detector, configured to cause the radiation source to emit a preamble light pulse having an energy $E_P$ and a pulse width $W_1$ towards the ROI, determine, if the preamble light pulse is detected by the detector and whether there is an object in the ROI, responsive to a determination that there is an object in the ROI, cause the radiation source to emit a scanning light pulse having an energy $E_L$ and a pulse width $W_2$ towards the ROI, else the radiation source to emit a scanning light pulse having an energy $E_H$ and the pulse width $W_2$ towards the ROI.

16 Claims, 14 Drawing Sheets

(51) Int. Cl.
*G01S 17/931* (2020.01)
*G01S 7/486* (2020.01)
*B60R 11/00* (2006.01)

(52) U.S. Cl.
CPC ............ *G01S 7/4816* (2013.01); *G01S 17/10* (2013.01); *G01S 17/931* (2020.01); *B60R 11/00* (2013.01); *B60R 2011/004* (2013.01); *B60R 2011/0026* (2013.01); *B60R 2011/0049* (2013.01)

(58) Field of Classification Search
CPC ............. B60R 11/00; B60R 2011/0026; B60R 2011/004; B60R 2011/0049
See application file for complete search history.

(56) References Cited

U.S. PATENT DOCUMENTS

| | | | |
|---|---|---|---|
| 7,583,364 | B1 | 9/2009 | Mayor et al. |
| 8,948,591 | B2 | 2/2015 | Scherbarth |
| 9,121,703 | B1 | 9/2015 | Droz et al. |
| 9,279,796 | B1 | 3/2016 | Weisberg |
| 2004/0012962 | A1* | 1/2004 | Wolf ................. G02B 27/0977 362/237 |
| 2014/0194955 | A1* | 7/2014 | Povolosky ............ A61N 2/002 607/89 |
| 2017/0184450 | A1* | 6/2017 | Doylend ................ G01B 11/22 |
| 2018/0088214 | A1 | 3/2018 | O'Keeffe |
| 2018/0164410 | A1 | 6/2018 | Gnecchi et al. |
| 2019/0064331 | A1* | 2/2019 | Russell .................... G01S 7/497 |
| 2019/0107606 | A1* | 4/2019 | Russell ................. G01S 7/4817 |
| 2020/0033474 | A1* | 1/2020 | Petit ........................ G01S 17/42 |
| 2021/0270938 | A1* | 9/2021 | Nothern, III .......... G01S 7/4817 |

FOREIGN PATENT DOCUMENTS

| | | |
|---|---|---|
| GB | 2295740 A | 6/1996 |
| JP | H07260937 A | 10/1995 |

OTHER PUBLICATIONS

International Search Report and Written Opinion of PCT/CN2021/104393; Lulu Zhou; dated Sep. 28, 2021.

Kurnit et al., "Generation of 1.54 micron radiation with application to an eye-safe laser lidar", In: Press S, editor. Proceedings of the international conference on LASERS'97, 1998. p. 608-610.

Roy et al., "Comparison of raman and degenerated optical parametric oscillators for a high-energy and high-repetition-rate eye-safe laser", Opt Eng, 1996, 35:3579-84.

Richter et al., "Design validation of an eye-safe scanning aerosol lidar with the center for lidar and atmospheric sciences students (CLASS) at Hampton University". In: Singh UN, editor. Lidar remote sensing for industry and environment monitoring II, Proc SPIE, 2002, 4484:8-16.

* cited by examiner

400

Accessible emission limits for Class 1 and Class 1M laser products and $C_6 = 1$ a,b

| Wavelength λ nm | Emission duration t s | | | | | | | | | |
|---|---|---|---|---|---|---|---|---|---|---|
| | $10^{-13}$ to $10^{-11}$ | $10^{-11}$ to $10^{-9}$ | $10^{-9}$ to $10^{-7}$ | $10^{-7}$ to $5 \times 10^{-6}$ | $5 \times 10^{-6}$ to $1,3 \times 10^{-5}$ | $1,3 \times 10^{-3}$ to 0,35 | 0,35 to 10 | 10 to $10^2$ | $10^2$ to $10^3$ | $10^3$ to $3 \times 10^3$ |
| 180 to 302,5 | $3 \times 10^{10}$ W·m$^{-2}$ | | | | | | 30 J·m$^{-2}$ | | | |
| 302,5 to 315 | $2,4 \times 10^4$ W | | Thermal hazard ($t \leq T_1$) $7,9 \times 10^{-7} C_1$ J | | | | Photochemical hazard $7,9 \times 10^{-7} C_2$ J ($t > T_1$) | | $7,9 \times 10^{-7} C_2$ J | |
| 315 to 400 | | | | $7,9 \times 10^{-7} C_1$ J | | | | $7,9 \times 10^{-3}$ J | $7,9 \times 10^{-3}$ J | $7,9 \times 10^{-6}$ W |
| 400 to 450 | | | $3,8 \times 10^{-8}$ J | | | $7,9 \times 10^{-4} t^{0.75}$ J | | $3,9 \times 10^{-3} C_2$ J | $3,9 \times 10^{-3} C_2$ J | |
| 450 to 500 | | | | | | | | $3,9 \times 10^{-3} C_3$ J and $^c$ $3,9 \times 10^{-4}$ W | $3,9 \times 10^{-5} C_3$ W | |
| 500 to 700 | | | | | | | | $3,9 \times 10^{-4}$ W | | |
| 700 to 1050 | | | $3,8 \times 10^{-8}$ J | $7,7 \times 10^{-8}$ J | | $7 \times 10^{-4} t^{0.75} C_4$ J | | $3,9 \times 10^{-4} C_4 C_7$ W | | |
| 1050 to 1400$^d$ | | | $3,8 \times 10^{-8} C_7$ J | $7,7 \times 10^{-7} C_7$ J | | $3,5 \times 10^{-3} t^{0.75} C_7$ J | | | | |
| 1400 to 1500 | $8 \times 10^5$ W | | | $8 \times 10^{-4}$ J | | $4,4 \times 10^{-3} t^{0.25}$ J | $10^{-2} t$ J | | $1,0 \times 10^{-2}$ W | |
| 1500 to 1800 | $8 \times 10^6$ W | | | | $8 \times 10^{-3}$ J | | $1,8 \times 10^{-2} t^{0.75}$ J | | | |
| 1800 to 2600 | $8 \times 10^5$ W | | | $8 \times 10^{-4}$ J | | $4,4 \times 10^{-3} t^{0.25}$ J | $10^{-2} t$ J | | | |
| 2600 to 4000 | $8 \times 10^4$ W | | $8 \times 10^{-5}$ J | | | $4,4 \times 10^{-3} t^{0.25}$ J | | | | |
| 4000 to $10^6$ | $10^{11}$ W·m$^{-2}$ | | 100 J·m$^{-2}$ | | | 5600 $t^{0.25}$ J·m$^{-2}$ | | 1000 W·m$^{-2}$ | | |

NOTE Laser products that meet the requirements for classification as Class 1 by satisfying measurement Condition 1 may be hazardous when used with viewing optics having greater than x7 magnification or objective diameters greater than those specified in Table 10.

a For correction factors and units, see Table 9.
b For AELs for emmission durations less than $10^{-13}$ s are set to be equal to the equivalent power or irradiance values of the AEL at $10^{-13}$ s.
c In the wavelength range between 450 nm and 500 nm, dual limits apply and a product's emmission shall not exceed either limit applicable to the class assigned.
d In the wavelength range between 1250 nm and 1400 nm, the upper value of the AEL is limited to the AEL value for Class 3B.

FIG. 6

| Wavelength $\lambda$ nm | Emission duration t s | | | | | | | | |
|---|---|---|---|---|---|---|---|---|---|
| | $10^{-13}$ to $10^{-11}$ | $10^{-11}$ to $10^{-9}$ | $10^{-9}$ to $10^{-7}$ | $10^{-7}$ to $5 \times 10^{-6}$ | $5 \times 10^{-6}$ to $1,3 \times 10^{-5}$ | $1,3 \times 10^{-5}$ to $1 \times 10^{-3}$ | $1 \times 10^{-3}$ to $0,35$ | $0,35$ to $10$ | $10$ to $10^2$ | $10^2$ to $10^3$ | $10^3$ to $3 \times 10^3$ |
| 700 to 1050 | $3,8 \times 10^{-8}$ J | | $7,7 \times 10^{-8}$ $C_4$ J | | | $7 \times 10^{-4} t^{0,75} C_4$ J | | $3,9 \times 10^{-4} C_4 C_7$ W | | |
| 1050 to 1400$^d$ | $3,8 \times 10^{-8}$ $C_7$ J | | $7,7 \times 10^{-7}$ $C_7$ J | | | $3,5 \times 10^{-3} t^{0,75} C_7$ J | | | | |

400-1

Correction factors and breakpoints for use in AEL and MPE evaluations

| Parameter | Spectral region nm |
|---|---|
| $C_4 = 10^{0,002(\lambda-700)}$ | 700 to 1050 |
| $C_4 = 5$ | 1050 to 1400 |

PREAMBLE PULSE BASED LIDAR SYSTEMS AND METHODS

FIELD OF TECHNOLOGY

The present disclosure relates to Light Detection and Ranging (LiDAR) systems, and more specifically, to Preamble pulse based LiDAR systems and methods.

BACKGROUND

Several computer-based navigation systems that are configured for aiding navigation and/or control of vehicles have been proposed and implemented in the prior art. These systems range from more basic map-aided localization-based solutions—i.e. use of a computer system to assist a driver in navigating a route from a starting point to a destination point; to more complex ones such as computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control systems implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the pre-defined distance. Some of the cruise control systems are further equipped with collision control systems, which systems, upon detection of the vehicle (or other obstacle) in front of the moving vehicle, slow down or stop the vehicle.

Some of the more advanced systems, such as, for example, Advanced Driver Assistance Systems (ADAS) has gained lots of attention in automotive industry while developing semi and/or fully autonomously driven vehicles. Such vehicles may be operated with minimum or even without a direct control of the operator (i.e. the driver). These autonomously driven vehicles include systems that can cause the vehicle to accelerate, brake, stop, change lane and self-park.

One of the main technical challenges in implementing the above systems is the ability to detect an object located around the vehicle. In one example, the systems may need the ability to detect the vehicle in front of the present vehicle (the present vehicle having the system onboard), which vehicle in front may pose a risk/danger to the present vehicle and may require the system to take a corrective measure, be it braking or otherwise changing speed, stopping or changing lanes.

Typically, ADAS employs a suite of sensors to detect and classify the different objects in a defined region of interest (ROI). One of the sensors used by ADAS is the light ranging and detection (LiDAR). In LiDAR-based system, objects around the vehicle can be detected by transmitting pulses of light towards the ROI, and measuring reflected light pulses with a detector. Lasers emitting pulses of light within a narrow wavelength are often used as the light source. The position and distance of the object can be computed using time-of-flight (TOF) calculations of the emitted and detected light pulses. By computing such positions as "data points", a digital multi-dimensional representation of the surroundings can be generated.

It is well established that the power of the reflected light pulses is inversely proportional to the square of distance traveled by the light pulses. Also, the power associated with the light pulses generated and transmitted by the LiDAR-based system has to satisfy an admissible exposure limit (AEL). In particular, AEL puts a limit on the power of the laser pulses, in order to make the laser pulses eyes-safe. As such, AEL is a complex function of wavelength, repetition rate, and energy per pulse. To this end, detecting the long distance objects is challenging due to low signal to noise ratio (SNR). Although, increasing the emitted pulse power will boost the SNR however the emitted pulse power is limited by the AEL due to the eye safety.

With this said, there is an interest in developing LiDAR-based system which has both, a high SNR as well as are safe for eyes.

Generally, there exist several methods and systems for determining distance to an object from the LiDAR system. For example, US 20180088214 A1, published on Mar. 29, 2018 and currently assigned to Okeeffe James Thomas, describes that a laser range finder generates high-intensity laser pulses with intensities above a threshold intensity (e.g. above an eye-safe intensity) in an adaptive-intensity region of the field of view. The laser range finder further generates lower intensity (e.g. eye-safe) laser pulses in a protective guard region (e.g. a guard ring) that surrounds the high-intensity laser pulses. The guard region is located in the FOV such that ingress paths to the adaptive-intensity region must first traverse the lower-intensity guard region. The laser range finder analyzes laser reflections from the guard region to improve timely prediction of object intrusion into the adaptive-intensity region, thereby providing time to determine object trajectory or object classification. Upon determination that an object is likely to intersect the high-intensity laser pulses the laser range finder can discontinue the high-intensity laser pulses and instead generate laser pulses below the threshold intensity (e.g. eye-safe intensity laser pulses).

U.S. Pat. No. 8,948,591 B2, published on Feb. 3, 2015 and currently assigned to AIRBUS DS ELECTRONICS AND BORDER SECURITY GMBH, GE, describes a method for operating a pulsed interference laser in an eye-safe manner in a DIRCM system onboard an aircraft is provided. A reception apparatus is used to receive echoes from the emitted pulses from the interference laser and to evaluate them to determine whether an object is situated within a prescribed laser safety distance for the DIRCM system in the laser beam. The emission of the laser beam is enabled separately for a respective period of time Δt within the period of use of the interference laser, the emission being enabled for the respective subsequent period of time Δt only if no object has been found within the laser safety distance within the respective preceding period of time Δt.

U.S. Pat. No. 9,121,703 B1, published on Sep. 1, 2015 and currently assigned to WAYMO LLC, CALIFORNIA, describes example methods and systems for controlling operation of a laser device are provided. A method may include receiving an output of a proximity sensor that is positioned adjacent to a laser device, and determining based on the output of the proximity sensor that an object is within a threshold distance to the laser device. The method may also include based on the laser device emitting laser pulses, providing, by a computing device, instructions to discontinue the emission of laser pulses by the laser device based on the object being within the threshold distance. The method may further include based on the laser device being inactive, providing, by the computing device, instructions to prevent the emission of laser pulses by the laser device based on the object being within the threshold distance.

SUMMARY

In accordance with a first broad aspect of the present disclosure, there is provided a LiDAR system comprising a radiation source configured to emit light pulses towards a region of interest (ROI), a detector configured to detect light pulses reflected from the ROI, a processor, communicatively coupled to the radiation source and the detector, the processor configured to cause the radiation source to emit a preamble light pulse having an energy $E_P$ and a pulse width $W_1$ towards the ROI, determine, if the preamble light pulse is detected by the detector and whether there is an object in the ROI, responsive to a determination that there is an object in the ROI, cause the radiation source to emit a scanning light pulse having an energy $E_L$ and a pulse width $W_2$ towards the ROI, and responsive to the determination that there is no object in the ROI, cause the radiation source to emit a scanning light pulse having an energy $E_H$ and the pulse width $W_2$ towards the ROI.

In accordance with other aspects of the present disclosure, the LiDAR system, wherein the energy $E_p$ is less than the energy $E_L$, the energy $E_L$ is less than the energy $E_H$ and the energy $E_H$ is less than or equals to a Peak Admissible Exposure Limit ($AEL_{peak\ per\ pulse}$).

In accordance with other aspects of the present disclosure, the LiDAR system, wherein the energy $E_L$=Standard Admissible Exposure Limit $AEL_{standard\ Average}-E_P$.

In accordance with other aspects of the present disclosure, the LiDAR system, wherein the energy $E_H$=MINIMUM (New Admissible Exposure Limit ($AEL_{New\ Average}$), Peak Admissible Exposure Limit ($AEL_{peak\ per\ pulse}$)).

In accordance with other aspects of the present disclosure, the LiDAR system, wherein the pulse width $W_1$ is smaller than the pulse width $W_2$.

In accordance with other aspects of the present disclosure, the LiDAR system, wherein the processor wait for a predetermined duration to determine if the preamble light pulse is detected by the detector, the predetermined duration is calculated based on an optimal preamble distance.

In accordance with other aspects of the present disclosure, the LiDAR system, wherein the optimal preamble distance is calculated based on a Peak Admissible Exposure Limit ($AEL_{peak\ per\ pulse}$), the width $W_2$, and a repetition frequency f of the light pulses.

In accordance with other aspects of the present disclosure, the LiDAR system further comprises omitting the preamble light pulse received after the predetermined duration.

In accordance with other aspects of the present disclosure, the LiDAR system, wherein the energy $E_P$ is calculated based on a minimum estimated signal-to-noise ratio (SNR).

In accordance with other aspects of the present disclosure, the LiDAR system, wherein the minimum SNR is estimated using a Neyman Pearson detector.

In accordance with a second broad aspect of the present disclosure, there is provided a LiDAR method comprising emitting, by a radiation source, light pulses towards a region of interest (ROI), detecting, by a detector, light pulses reflected from the ROI, causing, by a processor communicatively coupled to the radiation source, the radiation source to emit a preamble light pulse having an energy $E_P$ and a pulse width $W_1$ towards the ROI, determining, by the processor communicatively coupled to the detector, if the preamble light pulse is detected by the detector and whether there is an object in the ROI, responsive to a determination that if there is an object in the ROI, causing, by the processor, the radiation source to emit a scanning light pulse having an energy $E_L$ and a pulse width $W_2$ towards the ROI, and responsive to the determination that if there is no object in the ROI, causing, by the processor, the radiation source to emit a scanning light pulse having an energy $E_H$ and the pulse width $W_2$ towards the ROI.

In accordance with other aspects of the present disclosure, the LiDAR method, wherein the energy $E_p$ is less than the energy $E_L$, the energy $E_L$ is less than the energy $E_H$ and the energy $E_H$ is less than or equals to a Peak Admissible Exposure Limit ($AEL_{peak\ per\ pulse}$).

In accordance with other aspects of the present disclosure, the LiDAR method, wherein the energy $E_L$=Standard Admissible Exposure Limit $AEL_{standard\ Average}-E_P$.

In accordance with other aspects of the present disclosure, the LiDAR method, wherein the energy $E_H$=MINIMUM (New Admissible Exposure Limit ($AEL_{New\ Average}$), Peak Admissible Exposure Limit ($AEL_{peak\ per\ pulse}$)).

In accordance with other aspects of the present disclosure, the LiDAR method, wherein the pulse width $W_1$ is smaller than the pulse width $W_2$.

In accordance with other aspects of the present disclosure, the LiDAR method, wherein the processor wait for a predetermined duration to determine if the preamble light pulse is detected by the detector, the predetermined duration is calculated based on an optimal preamble distance.

In accordance with other aspects of the present disclosure, the LiDAR method, wherein the optimal preamble distance is calculated based on a Peak Admissible Exposure Limit ($AEL_{peak\ per\ pulse}$), the width $W_2$, and a repetition frequency f of the light pulses.

In accordance with other aspects of the present disclosure, the LiDAR method further comprises omitting the preamble light pulse received after the predetermined duration.

In accordance with other aspects of the present disclosure, the LiDAR method, wherein the energy $E_P$ is calculated based on a minimum estimated signal-to-noise ratio (SNR).

In accordance with other aspects of the present disclosure, the LiDAR method, wherein the minimum SNR is estimated using a Neyman Pearson detector.

Additional and/or alternative features, aspects and advantages of implementations of the present disclosure will become apparent from the following description, the accompanying drawings and the appended claims.

BRIEF DESCRIPTION OF THE DRAWINGS

These and other features, aspects and advantages of the present disclosure will become better understood with regard to the following description, appended claims and accompanying drawings where:

FIG. 6 illustrates a table from the "Australian/New Zealand Standard: safety of laser products" providing AELs for class 1 and class 1 M laser products;

FIG. 7 illustrates an abstracts of the tables providing AELs and correction factor from the "Australian/New Zealand Standard: safety of laser products";

Figure 1:
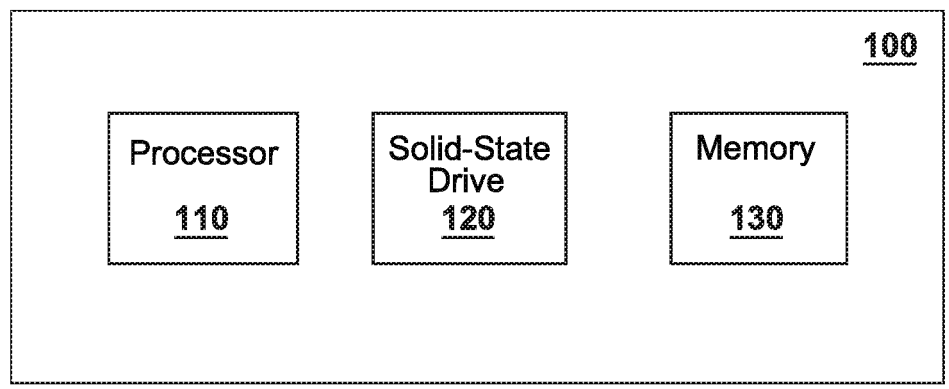
FIG. 1 depicts a high-level functional block diagram of an example computer system, in accordance with various embodiments of the present disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Various representative embodiments of the described technology will be described more fully hereinafter with reference to the accompanying drawings, in which representative embodiments are shown. The present disclosure concept may, however, be embodied in many different forms and should not be construed as limited to the representative embodiments set forth herein. Rather, these representative embodiments are provided so that the disclosure will be thorough and complete, and will fully convey the scope of the present disclosure to those skilled in the art. In the drawings, the sizes and relative sizes of layers and regions may be exaggerated for clarity. Like numerals refer to like elements throughout.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular representative embodiments and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Moreover, all statements herein reciting principles, aspects, and implementations of the present disclosure, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present disclosure. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present disclosure, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules or units which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present disclosure.

Referring initially to FIG. 1, there is shown a computer system 100 suitable for use with some implementations of the present disclosure, the computer system 100 comprising various hardware components including one or more single or multi-core processors collectively represented by processor 110, a solid-state drive 120, a memory 130, which may be a random-access memory or any other type of memory.

Communication between the various components of computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to certain embodiments of the present disclosure, the solid-state drive 120 stores program instructions suitable for being loaded into memory 130 and executed by processor 110 for determining a presence of an object. For example, the program instructions may be part of a vehicle control application executable by processor 110. It is to be noted that computer system 100 may include other components but have been omitted from the FIG. 1 for the purpose of simplicity and tractability, such as network communication modules, locationalization modules, and the like.

Figure 2:
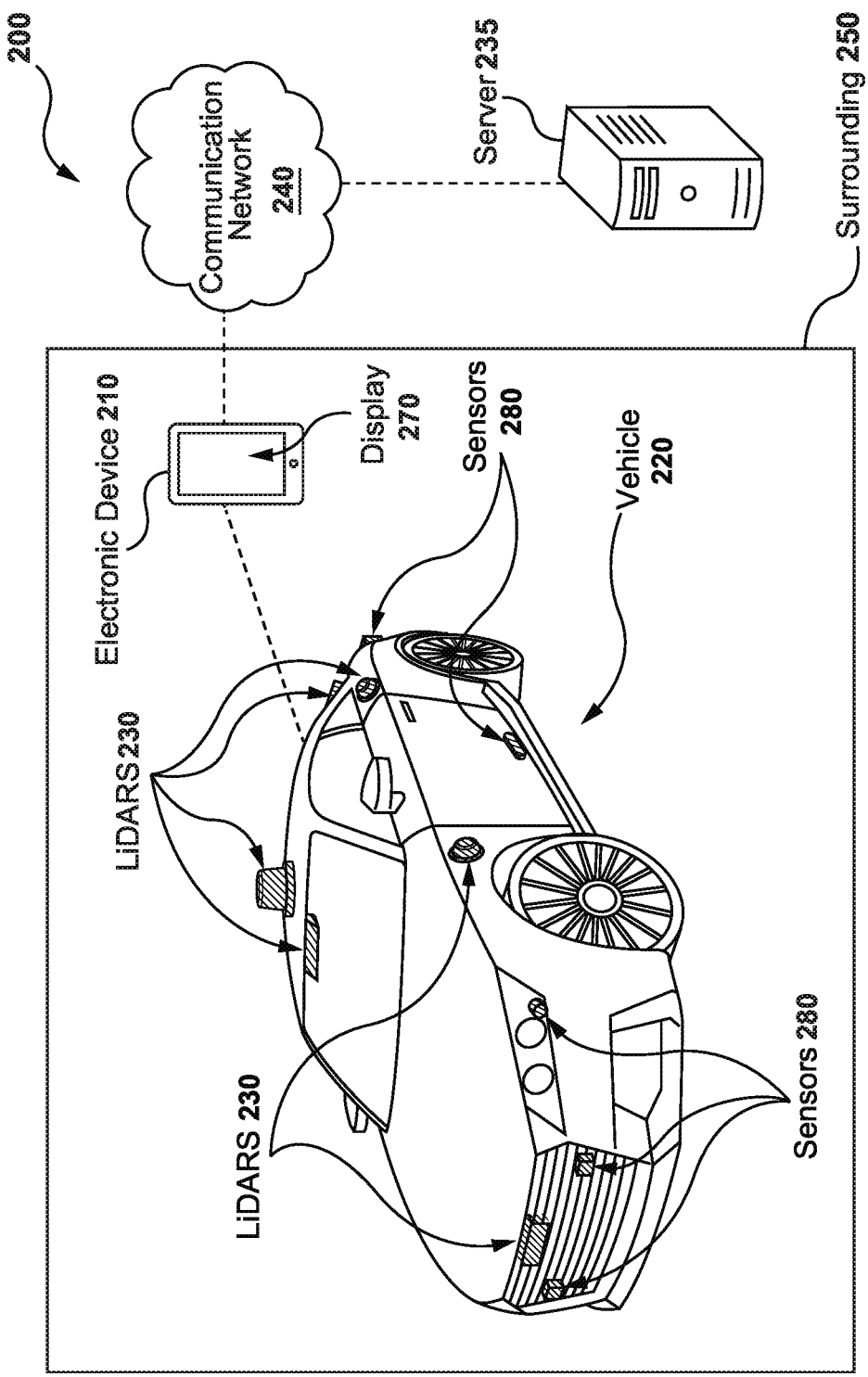
FIG. 2 depicts a networked computing environment being suitable for use with various embodiments of the present disclosure.

FIG. 2 illustrates a networked computer environment 200 suitable for use with some embodiments of the present disclosure. Networked computer environment 200 may comprise an electronic device 210 associated with a vehicle 220, and/or associated with a user (not depicted) who is associated with vehicle 220, such as an operator of vehicle 220, a server 235 in communication with electronic device 210 via a communication network 240 (e.g. the Internet or the like).

Vehicle 220 to which the electronic device 210 is associated may comprise any transportation vehicle, for leisure or otherwise, such as a private or commercial car, truck, motorbike or the like. Vehicle 220 may be user operated or a driver-less vehicle. In at least some embodiments of the present disclosure, it is contemplated that vehicle 220 may be implemented as a Self-Driving Car (SDC).

The implementation of electronic device 210 is not particularly limited, but as an example, electronic device 210 may be implemented as a vehicle engine control unit, a vehicle CPU, a vehicle navigation device, a tablet, a personal computer built into vehicle 220 and the like. Thus, it should be noted that electronic device 210 may or may not be permanently associated with the vehicle 220. Additionally or alternatively, electronic device 210 can be implemented in a wireless communication device such as a mobile telephone (e.g. a smart-phone or a radio-phone). In certain embodiments, electronic device 210 may have a display 270.

Electronic device 210 may comprise some or all of the components of computer system 100 depicted in FIG. 1. In certain embodiments, electronic device 210 is onboard computer device and comprises processor 110, solid-state drive 120 and memory 130. In other words, electronic device 210 comprises hardware and/or software and/or firmware, or a combination thereof, for processing data as will be described in greater detail below.

In some embodiments of the present disclosure, communication network 240 is the Internet. In alternative non-limiting embodiments, the communication network may be implemented as any suitable local area network (LAN), wide area network (WAN), a private communication network or the like. It should be understood that implementations for the communication network are for illustration purposes only. It is to be noted that implementation of a communication link (not separately numbered) between electronic device 210 and communication network 240 may depend inter alia on how electronic device 210 is implemented. By way of example and not as a limitation, in those embodiments of the present disclosure where electronic device 210 is implemented as a wireless communication device such as a smartphone or a navigation device, the communication link may be implemented as a wireless communication link. Examples of wireless communication links include, but are not limited to, a 3G communication network link, a 4G communication network link, and the like. Communication network 240 may also use a wireless connection with server 235.

In some embodiments of the present disclosure, server 235 is implemented as a computer server and may comprise some or all of the components of computer system 100 of FIG. 1. However, server 235 may also be implemented in any other suitable hardware, software, and/or firmware, or a combination thereof. In the depicted non-limiting embodiments of the present disclosure, the server is a single server. In alternative non-limiting embodiments of the present disclosure (not shown), the functionality of server 235 may be distributed and may be implemented via multiple servers.

Further, electronic device 210 may be communicatively with a variety of sensors and systems for gathering information about the surroundings of vehicle 220. As seen in FIG. 2, vehicle 220 may be equipped with a plurality of sensor systems 280. It should be noted that different sensor systems from plurality of sensor systems 280 may be used for gathering different types of data regarding the surroundings 250 of the vehicle 220.

In certain examples, plurality of sensor systems 280 may comprise one or more radar-type sensor systems that are mounted to vehicle 220 and communicatively coupled to processor 110. Broadly speaking, the one or more radar-type sensor systems may be configured to make use of radio waves to gather data about various portions of surroundings 250 of vehicle 220. For example, the one or more radar-type sensor systems may be configured to gather radar data about potential objects in surroundings 250 of vehicle 220 and which data may be representative of distance of objects from the radar-type sensor system, orientation of objects, velocity and/or speed of objects, and the like.

It should be noted that plurality of sensor systems 280 may comprise additional types of sensor systems to those non-exhaustively described above and without departing from the scope of the present disclosure.

Furthermore, vehicle 220 may be equipped with one or more Light Detection and Ranging (LiDAR) systems 230 for gathering information about surroundings 250 of the vehicle 220. LiDAR system 230 may be in addition to, or in some cases instead of, the plurality of sensor systems 280. A given LiDAR system 230 from one or more LiDAR systems 230 may be mounted (or retrofitted) to vehicle 220 in a variety of locations and/or in a variety of configurations.

For example, a given LiDAR system 230 may be mounted on an interior, upper portion of a windshield of the vehicle 220. Nevertheless, as illustrated in FIG. 2, other locations for mounting LiDAR system 230 are within the scope of the present disclosure, including on a back window, side windows, front hood, rooftop, front grill, front bumper or the side of vehicle 220. In some cases, LiDAR system 230 may even be mounted in a dedicated enclosure mounted on the top of vehicle 220.

As mentioned above, the one or more LiDAR systems 230 may also be mounted in a variety of configurations.

In one embodiment, LiDAR system 230 of one or more LiDAR systems 230 that is illustrated in FIG. 2 as being mounted to the rooftop of vehicle 220 may be so-mounted in a rotatable configuration. For example, LiDAR system 230 mounted to vehicle 220 in a rotatable configuration may comprise at least some components that are rotatable 360 degrees about an axis of rotation of LiDAR system 230. It should be noted that LiDAR system 230 mounted in rotatable configurations may gather data about most of the portions of the surroundings 250 of the vehicle 220.

In another embodiment, LiDAR system 230 of one or more LiDAR systems 230 that is mounted to the side (or the front grill, for example) of vehicle 220 may be so-mounted in a non-rotatable configuration. For example, LiDAR system 230 mounted to vehicle 220 in a non-rotatable configuration may comprise at least some components that are not rotatable 360 degrees and are configured to gather data about pre-determined portions of surroundings 250 of vehicle 220.

Irrespective of the specific location and/or the specific configuration, in certain embodiments LiDAR system 230 may be configured to capture data about the surroundings 250 of the vehicle 220 for building a multi-dimensional map of objects in the surroundings 250 of vehicle 220.

Figure 3:
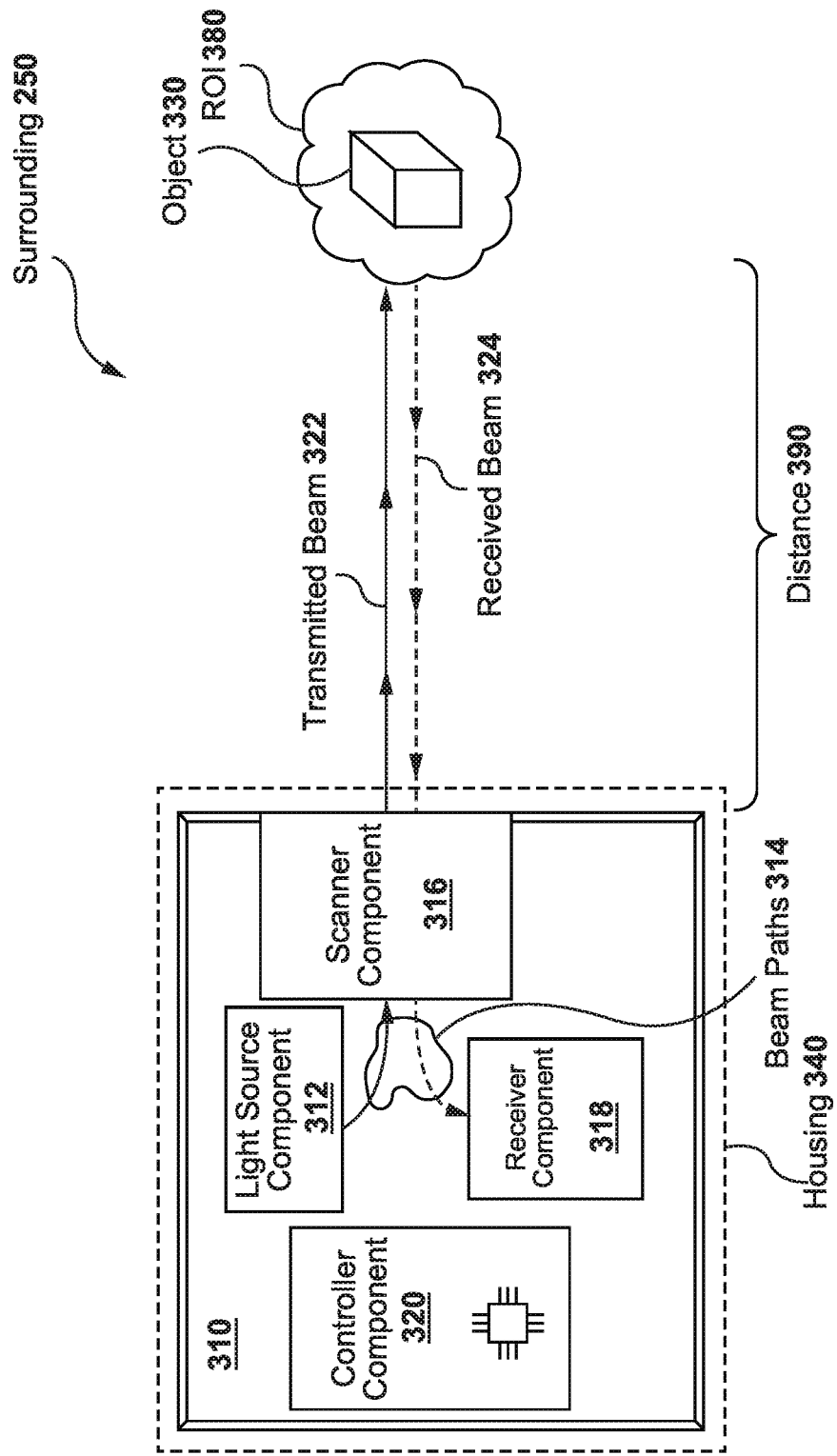
FIG. 3 depicts a high-level functional block diagram of an example LiDAR system, in accordance with various embodiments of the present disclosure.

With reference to FIG. 3, there is depicted a non-limiting example of a LiDAR system 310. It should be noted that the one or more LiDAR systems 230 (see FIG. 2) may be implemented in a similar manner to the implementation of the LiDAR system 310.

Broadly LiDAR system 310 may comprise a variety of internal components such as, but not limited to a radiation source component 312, such as a light source component, a scanner component 316, a receiver component 318, and a controller component 320. It is contemplated that in addition to the internal components non-exhaustively listed above, LiDAR system 310 may further comprise a variety of sensors (such as, for example, a temperature sensor, a moisture sensor, etc.) which are omitted from FIG. 3 for purpose of simplicity.

It is contemplated that, in some cases, one or more of internal components of LiDAR system 310 may be implemented in a common housing 340 as depicted in FIG. 3. In other implementations, at least controller component 320 may be located remotely from the common housing 340.

Radiation source component 312 may be communicatively coupled to controller component 320 and may be configured to emit radiation, such as a radiation signal in the form of a beam. In certain embodiments, radiation source component 312 is configured to emit light, and is referred to herein as a light source component 312. Light source component 312 may comprise one or more lasers that emit light having a particular operating wavelength. The operating wavelength of light source component 312 may be in the infrared, visible, and/or ultraviolet portions of the electromagnetic spectrum. For example, light source component 312 may include one or more lasers with an operating wavelength between about 650 nm and 1150 nm. Alternatively, light source component 312 may include a laser diode configured to emit light at a wavelength between about 800 nm and about 1000 nm, between about 850 nm and about 950 nm, or between about 1300 nm and about 1600 nm. However, it should be noted that light source component 312 may include lasers with different operating wavelengths, without departing from the scope of the present disclosure.

In operation, light source component 312 may generate a transmitted beam 322 of light. It is contemplated that transmitted beam 322 may have any suitable form such as continuous-wave, or pulsed. As illustrated in FIG. 3, transmitted beam 322 exits the LiDAR system 310 and is directed downrange towards the surroundings 250.

Let it be assumed that an object 330 is located at a distance 390 from LiDAR system 310. It should be noted though, the presence of object 330 and distance 390 may not known apriori and that the purpose of LiDAR system 310 may be to locate object 330 and/or capture data for building a multi-dimensional map of at least a portion of surroundings 250 with object 330 (and other potential objects) being represented in it in a form of one or more data points.

Once transmitted beam 322 reaches object 330, object 330 may reflect at least a portion of light from transmitted beam 322, and some of the reflected light beams may return back towards LiDAR system 310. By reflected, it is meant that at least a portion of the light beam from transmitted beam 322 bounces off object 330. A portion of the light beam from transmitted beam 322 may be absorbed by object 330. Also, a portion of the light beam from transmitted beam 322 may scatter or be refracted by object 330.

In the example illustrated in FIG. 3, the reflected light beam is represented by received beam 324. Received beam 324 may be a portion of transmitted beam 322 which may be captured by LiDAR system 310 via receiver component 318. It should be noted that, in some cases, received beam 324 may contain only a relatively small fraction of the light from transmitted beam 322. It should also be noted that an angle of received beam 324 relative to a surface of object 330 ("angle of incidence") may be the same or different than an angle of transmitted beam 322 relative to surface of object 330 ("angle of reflection").

It should also be noted that the operating wavelength of LiDAR system 310 may lie within portions of the electromagnetic spectrum that correspond to light produced by the sun. Therefore, in some cases, sunlight may act as background noise which can obscure the light signal detected by LiDAR system 310. This solar background noise may result in false-positive detections and/or may otherwise corrupt measurements of LiDAR system 310. Although it may be feasible to increase a Signal-to-Noise Ratio (SNR) of LiDAR system 310 by increasing the power level of transmitted beam 322, this may not be desirable in at least some situations. For example, increasing power levels of transmitted beam 322 may result in LiDAR system 310 not being eye-safe.

As previously alluded to, light source component 312 may include one or more pulsed lasers configured to produce, emit, or radiate pulses of light with certain pulse duration. For example, light source component 312 may be configured to emit pulses with a pulse duration (e.g., pulse width) ranging from for example 5 ps to 100 ns. In another example, light source component 312 may emit pulses at a pulse repetition frequency of approximately 100 kHz to 5 MHz or a pulse period (e.g., a time between consecutive pulses) of approximately 200 ns to 10 μs. Overall, however, light source component 312 may generate transmitted beam 322 with any suitable average optical power, and transmitted beam 322 may include optical pulses with any suitable pulse energy or peak optical power for a given application.

In some embodiments, light source component 312 may comprise one or more laser diodes, such as but not limited to: Fabry-Perot laser diode, a quantum well laser, a distributed Bragg reflector (DBR) laser, a distributed feedback (DFB) laser, or a vertical-cavity surface-emitting laser (VCSEL). Just as examples, a given laser diode operating in light source component 312 may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable laser diode. It is also contemplated that light source component 312 may include one or more laser diodes that are current-modulated to produce optical pulses.

It is also contemplated that transmitted beam 322 emitted by the light source component 312 may be unpolarized or randomly polarized, may have no specific or fixed polarization (e.g., the polarization may vary with time), or may have a particular polarization (e.g., the transmitted beam 322 may be linearly polarized, elliptically polarized, or circularly polarized).

In at least some embodiments, transmitted beam 322 and received beam 324 may be substantially coaxial. In other words, transmitted beam 322 and received beam 324 may at least partially overlap or share a common propagation axis, so that received beam 324 and transmitted beam 322 travel along substantially the same optical path (albeit in opposite directions). Nevertheless, in other embodiments, it is contemplated that transmitted beam 322 and received beam 324 may not be coaxial, or in other words, may not overlap or share a common propagation axis inside LiDAR system 310, without departing from the scope of the present disclosure.

It should be noted that in at least some embodiments of the present disclosure, light source component 312 may be rotatable, such as by 360 degrees or less, about the axis of rotation (not depicted) of LiDAR system 310 when LiDAR system 310 is implemented in a rotatable configuration. However, in other embodiments, light source component 312 may be stationary even when LiDAR system 310 is implemented in a rotatable configuration, without departing from the scope of the present disclosure.

As schematically illustrated in FIG. 3, LiDAR system 310 may make use of a given internal beam path from a plurality of internal beam paths 314 for emitting transmitted beam 322 (generated by light source component 312) towards surroundings 250. In one example, the given internal beam path amongst plurality of internal beam paths 314 may allow providing the light from light source component 312 to scanner component 316 and, in turn, scanner component 316 may allow transmitted beam 322 to be directed downrange towards surroundings 250.

Also, LiDAR system 310 may make use of another given internal beam path from plurality of internal beam paths 314 for providing received beam 324 to receiver component 318. In one example, the another given internal beam path amongst plurality of internal beam paths 314 may allow providing received beam 324 from scanner component 316 to receiver component 318. In another example, the another given internal beam path amongst plurality of internal beam paths 314 may allow providing received beam 324 directly from surroundings 250 to receiver component 318 (without received beam 324 passing through scanner component 316).

It should be noted that plurality of internal beam paths 314 may comprise a variety of optical components. For example, LiDAR system 310 may include one or more optical components configured to condition, shape, filter, modify, steer, or direct transmitted beam 322 and/or received beam 324. For example, LiDAR system 310 may include one or more lenses, mirrors, filters (e.g., band pass or interference filters), optical fibers, circulators, beam splitters, polarizers, polarizing beam splitters, wave plates (e.g., half-wave or quarter-wave plates), diffractive elements, microelectromechanical (MEM) elements, collimating elements, or holographic elements.

It is contemplated that in at least some embodiments, the given internal beam path and the another internal beam path from plurality of internal beam paths 314 may share at least some common optical components, however, this might not be the case in each and every embodiment of the present disclosure.

Generally, scanner component 316 steers transmitted beam 322 in one or more directions downrange towards surroundings 250. Scanner component 316 may comprise a variety of optical components and/or mechanical-type components for performing the scanning of transmitted beam 322. For example, scanner component 316 may include one or more mirrors, prisms, lenses, MEM components, piezoelectric components, optical fibers, splitters, diffractive elements, collimating elements, and the like. It should be noted scanner component 316 may also include one or more actuators (not illustrated) driving at least some optical components to rotate, tilt, pivot, or move in an angular manner about one or more axes, for example.

Scanner component 316 may be configured to scan transmitted beam 322 over a variety of horizontal angular ranges and/or vertical angular ranges. In other words, scanner component 316 may be instrumental in providing LiDAR system 310 with a desired Region of Interest (ROI) 380. ROI 380 of LiDAR system 310 may refer to an area, a volume, a region, an angular range, and/or portion(s) of surroundings 250 about which LiDAR system 310 may be configured to scan and/or can capture data.

It should be noted that scanner component 316 may be configured to scan transmitted beam 322 horizontally and/or vertically, and as such, ROI 380 of LiDAR system 310 may have a horizontal direction and a vertical direction. For example, LiDAR system 310 may have a horizontal ROI of 360 degrees and a vertical ROI of 45 degrees.

Scanner component 316 may be communicatively coupled to controller component 320. As such, controller component 320 may be configured to control scanner component 316 so as to guide transmitted beam 322 in a desired direction downrange and/or along a desired scan pattern. Broadly, a scan pattern may refer to a pattern or path along which transmitted beam 322 is directed by scanner component 316 during operation.

LiDAR system 310 may thus make use of the scan pattern to generate a point cloud substantially covering ROI 380 of LiDAR system 310. This point cloud of LiDAR system 310 may be used to render a multi-dimensional map of objects in surroundings 250 of vehicle 220.

In operation, in certain embodiments, light source component 312 emits pulses of light (represented by transmitted beam 322) which scanner component 316 scans across ROI 380 of LiDAR system 310 in accordance with the scan pattern. As mentioned above, object 330 may reflect one or more of the emitted pulses. Receiver component 318 receives or detects photons from received beam 324 and generates one or more representative data signals. For example, receiver component 318 may generate an output electrical signal that is representative of received beam 324. Receiver component 318 may also provide the so-generated electrical signal to controller component 320 for further processing.

Receiver component 318 is communicatively coupled to controller component 320 and may be implemented in a variety of ways. For example, receiver component 318 may comprise a photoreceiver, optical receiver, optical sensor, detector, photodetector, optical detector, optical fibers, and the like. As mentioned above, in some embodiments, receiver component 318 acquires or detects at least a portion of received beam 324 and produces an electrical signal that corresponds to received beam 324. For example, if received beam 324 includes an optical pulse, receiver component 318 may produce an electrical current or voltage pulse that corresponds to optical pulse detected by receiver component.

It is contemplated that receiver component 318 may be implemented with one or more avalanche photodiodes (APDs), one or more single-photon avalanche diodes (SPADs), one or more PN photodiodes (e.g., a photodiode structure formed by a p-type semiconductor and a n-type semiconductor), one or more PIN photodiodes (e.g., a photodiode structure formed by an undoped intrinsic semiconductor region located between p-type and n-type regions), and the like.

In some non-limiting embodiments, receiver component 318 may also comprise circuitry that performs signal amplification, sampling, filtering, signal conditioning, analog-to-digital conversion, time-to-digital conversion, pulse detection, threshold detection, rising-edge detection, falling-edge detection, and the like. For example, receiver component 318 may include electronic components configured to convert a received photocurrent (e.g., a current produced by an APD in response to a received optical signal) into a voltage signal. The receiver component 318 may also include additional circuitry for producing an analog or digital output signal that corresponds to one or more characteristics (e.g., rising edge, falling edge, amplitude, duration, and the like) of a received optical pulse.

Depending on the implementation, controller component 320 may include one or more processors, an application-specific integrated circuit (ASIC), a field-programmable gate array (FPGA), and/or other suitable circuitry. Controller component 320 may also include non-transitory computer-readable memory to store instructions executable by controller component 320 as well as data which controller component 320 may produce based on the signals acquired from other internal components of LiDAR system 310 and/or may provide signals to the other internal components of LiDAR system 310. The memory can include volatile (e.g., RAM) and/or non-volatile (e.g., flash memory, a hard disk) components. Controller component 320 may be configured to generate data during operation and store it in the memory. For example, this data generated by controller component 320 may be indicative of the data points in the point cloud of LiDAR system 310.

It is contemplated that in at least some non-limiting embodiments of the present disclosure, controller component 320 may be implemented in a similar manner to electronic device 210 and/or computer system 100, without departing from the scope of the present disclosure.

In addition to collecting data from receiver component 318, controller component 320 may also be configured to provide control signals to, and potentially receive diagnostics data from, light source component 312 and scanner component 316.

As previously stated, controller component 320 is communicatively coupled to one or more of light source component 312, scanner component 316, and receiver component 318. Controller component 320 may receive electrical trigger pulses from the light source component 312, where each electrical trigger pulse corresponds to the emission of an optical pulse by light source component 312. Controller component 320 may further provide instructions, a control signal, and/or a trigger signal to light source component 312 indicating when the light source component 312 is to produce optical pulses.

Just as an example, controller component 320 may be configured to send an electrical trigger signal that includes electrical pulses, so that light source component 312 emits an optical pulse in response to each electrical pulse of the electrical trigger signal. It is also contemplated that, controller component 320 may cause light source component 312 to adjust one or more characteristics of light produced by light source component 312 such as, but not limited to: frequency, period, duration, pulse energy, peak power, average power, and wavelength of the optical pulses.

It should be noted that controller component 320 may be configured to determine a "time-of-flight" value for an optical pulse based on timing information associated with (i) when a given pulse was emitted by light source component 312 and (ii) when a portion of the pulse (e.g., from received beam 324) was detected or received by the receiver component 318.

It is contemplated that controller component 320 may be configured to analyze one or more characteristics of the electrical signals from light source component 312 and/or receiver component 318 to determine one or more characteristics of object 330 such as distance 390 downrange from LiDAR system 310.

For example, controller component 320 may determine the time-of-flight value and/or a phase modulation value for the emitted pulse of transmitted beam 322. Let it be assumed that LiDAR system 310 determines the time-of-flight value "T" representing, in a sense, a "round-trip" time for an emitted pulse to travel from LiDAR system 310 to object 330 and back to LiDAR system 310. As a result, controller component 320 may be configured to determine distance 390 in accordance with the following equation:

$$D = \frac{c * T}{2} \quad (1)$$

wherein D is distance 390, T is the time-of-flight value, and c is the speed of light. Although, the ideal speed of light in vacuum is 299,792,458 m/s however, the actual value of speed of light may depend upon the refractive index n of the medium in which the light is travelling. The relation between the ideal speed of light in vacuum and the speed of light a given medium is given in accordance with the following equation:

$$v = \frac{c}{n} \quad (2)$$

wherein v is the velocity of light in a given medium and n is the refractive index of the corresponding medium. For example, if the medium is air, the refractive index n is approximately equal to 1.0003 and hence the speed of light is approximately equal to 299, 702,547 m/s. Similarly, if the medium is a glass, the refractive index n is approximately equal to 1.5 and hence the speed of light is approximately equal to 199,861,638 m/s. It is to be noted that for the purpose of simplicity the speed of light in air is considered as approximately equal to $3.0 \times 10^8$ m/s for making various calculations in the present disclosure. However, the actual value of speed of light may be considered for making various calculations without limiting the scope of present disclosure.

As previously alluded to, LiDAR system 310 is used to determine the distance to one or more other potential objects located in surroundings 250. By scanning transmitted beam 322 across ROI 380 of LiDAR system 310 in accordance with a scanning pattern, LiDAR system 310 is configured to map distances (similar to distance 390) to respective data points within ROI 380 of LiDAR system 310. As a result, LiDAR system 310 may be configured to render these data points captured in succession (e.g., the point cloud) in a form of a multi-dimensional map.

As an example, this multi-dimensional map is used by electronic device 210 for detecting, or otherwise identifying, objects or determining a shape or distance of potential objects within ROI 380 of LiDAR system 310. It is contemplated that LiDAR system 310 may be configured to repeatedly/iteratively capture and/or generate point clouds at any suitable rate for a given application.

It should be noted that a location of a given object in surroundings 250 of vehicle 220 may be overlapped, encompassed, or enclosed at least partially within the ROI of LiDAR system 310. For example, object 330 may include all or a portion of a person, vehicle, motorcycle, truck, train, bicycle, wheelchair, pushchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

With these non-limiting embodiments regarding LiDAR system 310 in place, we will now consider some specific examples to illustrate various implementations of aspects of the present disclosure.

As previously discussed (in FIG. 3), received beam 324 may be a portion of transmitted beam 322 which may be captured by LiDAR system 310 via the receiver component 318. Further, received beam 324 may be subject to various sort of noise, thereby attenuating SNR. Also, in general the power $P_{rx}(t)$ associated with received beam 324 is inversely proportional with the distance D which has been illustrated as distance 390 of object 330 from LiDAR system 310. This relation further leads to a significant attenuation for the SNR due the objects situated at a longer distance from LiDAR system 310. Moreover, power $P_{rx}(t)$ associated with received beam 324 is linearly proportional with the power $P_{tx}(t)$ associated with transmitted beam 322. This can be mathematically expressed as:

$$P_{rx}(t) \alpha \frac{P_{tx}(t)}{D^2} \quad (3)$$

It is clear form equation (3) that increasing the power $P_{tx}(t)$ associated with transmitted beam 322 may significantly improve the SNR. Since, light having a wavelength in the 600-1000 nm range may be focused and absorbed by the eye, the maximum power $P_{tx}(t)$ associated with transmitted beam 322 is limited by eye safety regulations, such as those defined in the "Australian/New Zealand Standard: safety of laser products".

In the present disclosure, embodiments of the invention will be described with reference to the nomenclature of "Australian/New Zealand Standard: safety of laser products", but it should be understood that the invention also applies to successors and counterparts of both of this standard.

The "Australian/New Zealand Standard: safety of laser products" defines a Maximum Permissible Exposure (MPE) and an Accessible Emission Limit (AEL). The MPE is the maximal optical radiation level a person can be exposed to before undergoing immediate or long term injuries. This maximum permissible exposure was established from the energy density limits, or the power-per-surface-unit (intensity) limits, that can be admitted on the cornea and on the skin. The MPE is calculated as a function of the radiation wavelength, the pulse duration, the exposure duration of the exposed tissue (skin or eye), and the size of the image on the retina. While the MPE defines the maximum pulse energies in terms of risk of injury, the AEL is derived from the radiation wavelength, power and energy emitted by the laser and accessible to a user (e.g., a human eye) at a specified distance 390 from LiDAR system 310.

Such definitions are used by eye safety regulations as they represent a realistic closest approach to LiDAR system 310 by a human eye or an observation instrument such as a telescope. Using the definitions of "Australian/New Zealand Standard: safety of laser products" an aperture 395 (discussed below in further details) may be defined as a circular area having a diameter of 7 mm at a distance of 12 cm from LiDAR system 310. The AEL therefore enables the classification of lasers according to the related radiation hazard, depending on the characteristics of each laser.

Figure 4:
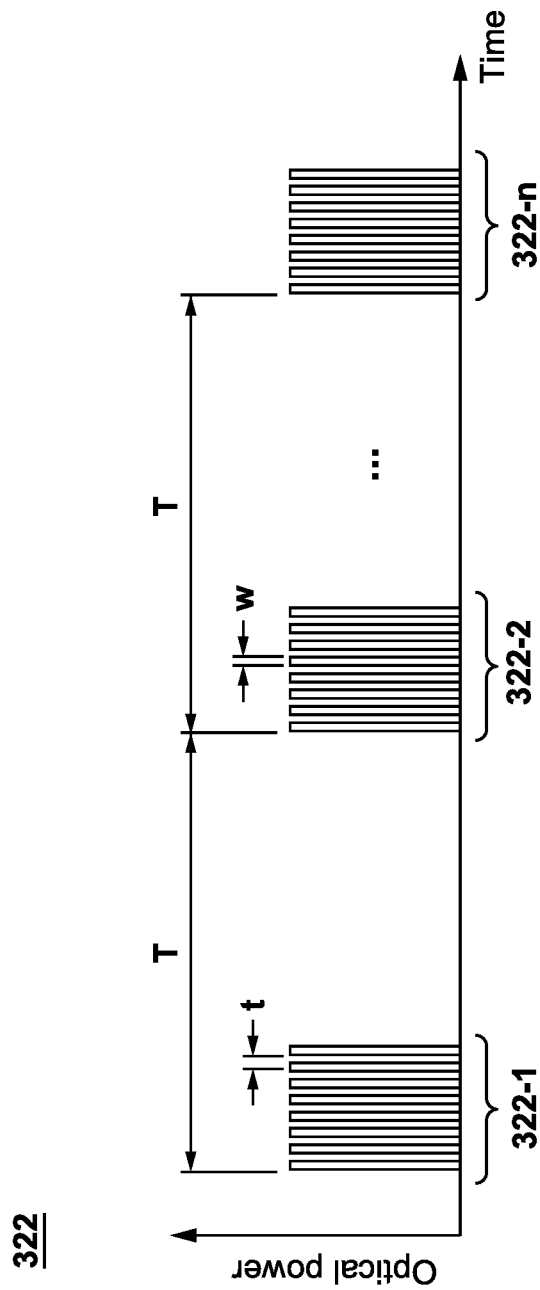
FIG. 4, illustrates an example of a transmitted beam including groups of light pulses, in accordance with various embodiments of present disclosure.

As discussed above, transmitted beam 322 may comprise light pulses. FIG. 4, illustrates an example of transmitted beam 322 including group of light pulses in accordance with various embodiments of present disclosure. As shown, in a non-limiting embodiment transmitted beam 322 may include groups of light pulses, such as, for example, groups of light pulses 322-1, 322-2 . . . 322-n. The number of light pulses in each group of light pulses 322-1, 322-2 . . . 322-n, along with the power level and width w of each light pulse may be selected to enable reliable detection of reflected beam 322 by receiver component 318. Also, in certain embodiments, two light pulses in a group of pulses may be separated by some angular displacement. For example, the two light pulses in group of light pulses 322-1 may be separated by an angular distance of 0.1° degree (horizontal and/or vertical angular resolution).

In certain non-limiting embodiments, the time difference t between two light pulses in group of light pulses 322-1 may be equals to 10 μs. That is, within group of light pulses 322-1, light pulses may have a repetition rate f of 100 KHz. Also, in one embodiment the light pulses may have a wavelength of 905 nanometer (nm) and each pulse may have a width of 5 nanosecond (ns). It is to be noted that the above specifications of light pulses and group of light pulse are merely examples and any other suitable specification may be employed without limiting the scope of present disclosure. It will be appreciated that although the above specifications have been specified with respect to group of light pulses 322-1, however, same specifications are equally applicable to each group of light pulses 322-2 . . . 322-n.

In accordance with the "Australian/New Zealand Standard: safety of laser products" the total energy/power of the light pulses in group of light pulses 322-1 received a human eye in vicinity of LiDAR system 310 while LiDAR system 310 is scanning for objects may be determined in terms of $AEL_{Total}$.

Given the repetition rate of light pulses as f and the number of light pulses in group of light pulses 322-1 be N, the $AEL_{Total}$ is calculated using the requirements as specified in the "Australian/New Zealand Standard: safety of laser products" considering N light pulses as one pulse of duration T=N/f. The energy/power per pulse may be estimated by averaging $AEL_{Total}$:

$$AEL_{Average} = \frac{AEL_{Total}}{N} \quad (4)$$

In order for transmitted beam 322 to be eye safe, the value of $AEL_{Average}$ (Also herein referred to as $AEL_{standard\ Average}$)

as expressed using equation (3) has to be smaller than the maximum $AEL_{per\ pulse}$ (Also herein referred to as $AEL_{peak\ per\ pulse}$) for each light pulse as required in accordance with the "Australian/New Zealand Standard: safety of laser products".

Figure 5:
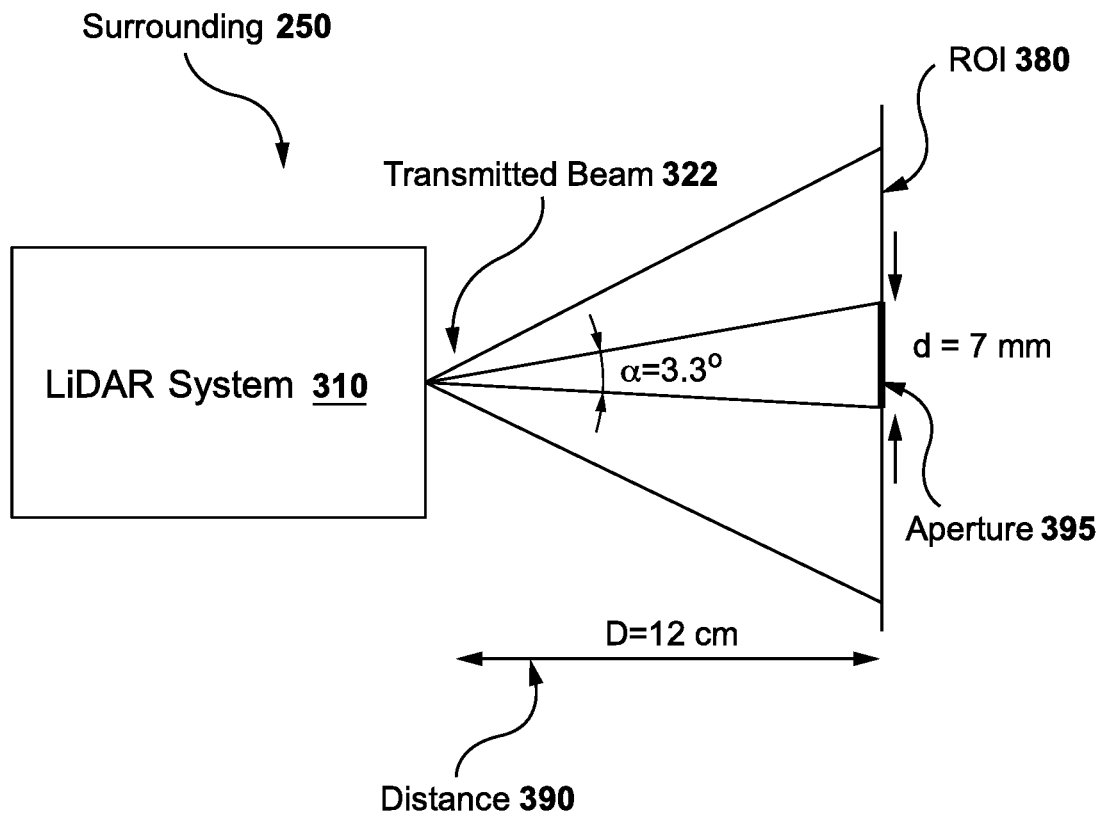
FIG. 5 illustrates a high-level functional block diagram of LiDAR system placed at a minimum distance from region of interest (ROI) in surrounding, in accordance with various embodiments of present disclosure.

FIG. 5 illustrates a high-level functional block diagram of LiDAR system 310 placed at a minimum distance 390 from ROI 380 in surrounding 250, in accordance with various embodiments of present disclosure. As shown, transmitted beam 322 from the LIDAR system 310 may be directed towards ROI 380. In certain embodiments, there are chances that a human being may be present in the ROI 380. On an average, a human eye's pupil is around 7 mm wide open. For the purpose of simple illustration only, a human eye's pupil is being represented as aperture 395, having a diameter of 7 mm. Since, the knowledge of presence of a human being is now known apriori, to this end, it has been assumed that aperture 395 may be located at 12 cm from the LiDAR system 310.

In order to calculate the number of light pulses that aperture 395 may receive when the transmitted beam 322 from the LIDAR system 310 is directed towards ROI 380, an exposure angle α is calculated as:

$$\alpha = \tan^{-1}\left(\frac{7\ mm}{12\ cm}\right) = 3.3° \quad (5)$$

Assuming, an angular resolution of 0.1° (as previously discussed), the number of light pulses N received by aperture 395 then may be calculated as $$\frac{3.3}{0.1} = 33$$

light pulses. Since the repetition rate f is assumed to be 100 kHz, the overall emission duration of 33 light pulses to compute the $AEL_{Total}$ is determined using relation T=N/f as 33 light pulses/100 kHz=330 μSec.

FIG. 6 illustrates a table 400 from the "Australian/New Zealand Standard: safety of laser products" providing AELs for class 1 and class 1 M laser products. For a given emission duration and the associated wave length, using table 400 the $AEL_{Total}$ may be computed.

FIG. 7 illustrates an abstract table 400-1 from table 400 and another abstract table 402 providing correction factor from the "Australian/New Zealand Standard: safety of laser products". As previously computed the overall emission duration of 33 light pulses as 330 μSec and the associated wavelength as 905 nm, the $AEL_{Total}$ may be computed using AEL value from abstract table 400-1 as $7\times10^{-4}t^{0.75}C_4$ joules, where $C_4$ is computed using correction factor provided by abstract table 402 as $C_4=10^{0.002(\lambda-700)}$. The $AEL_{Total}$ comes out to be 4.4 μJ. For 33 light pulses, using equation (4), the $AEL_{Average}$ is computed as 133.5 nJ (26.7 W peak power). Also is it noted from abstract table 400-1 that the peak $AEL_{peak\ per\ pulse}$ for a light pulse having a width of 5 ns is 200 nJ (40 W peak power).

As noted above, for a given angular resolution, the number of light pulses that may scan aperture 395 depends mainly on the exposure angle α. The exposure angle α=3.3° in equation (5) is calculated using minimum distance of 12 cm of aperture 395 from the Lidar system 310 since there was no pre-knowledge about nearest aperture 395 to Lidar system 310.

Figure 8:
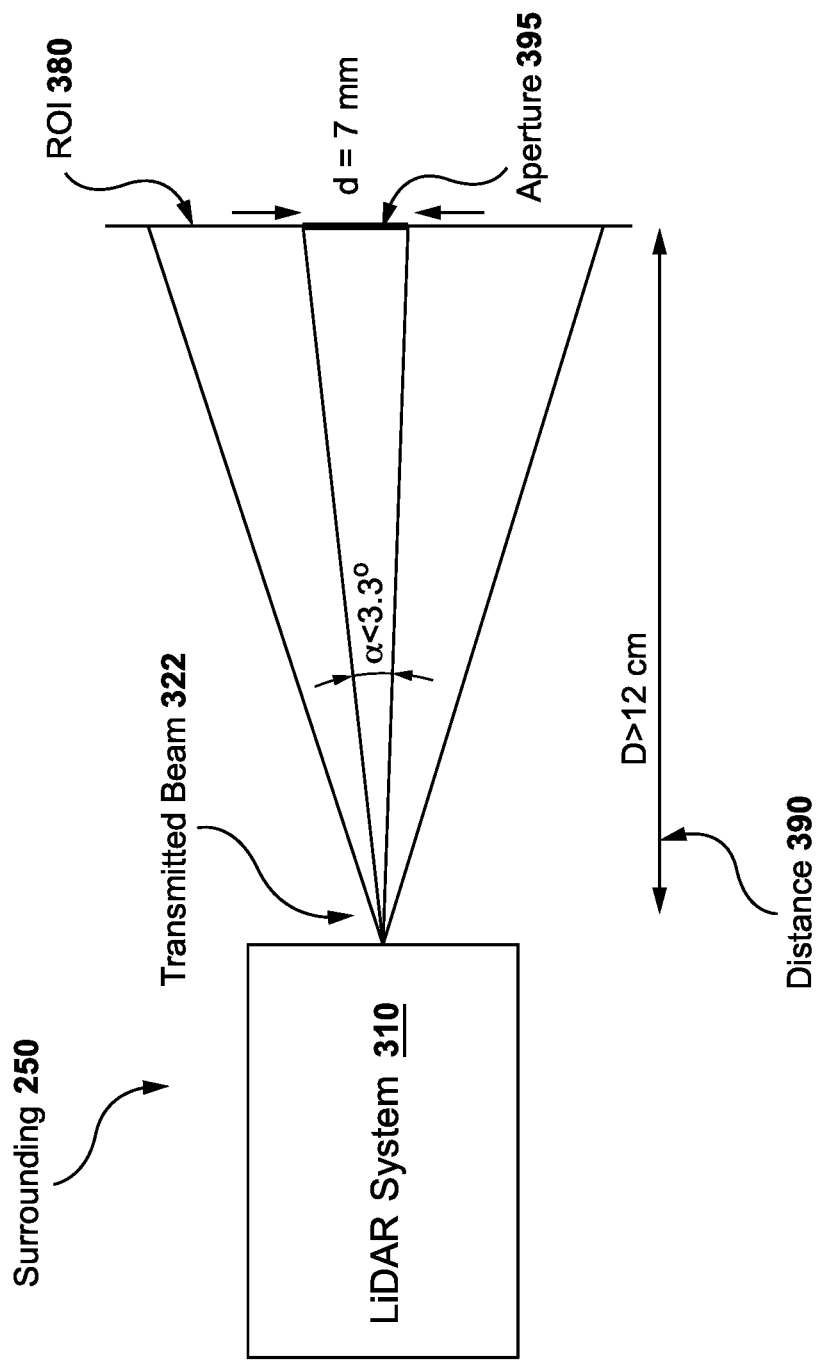
FIG. 8 illustrates a high-level functional block diagram of LiDAR system placed at a distance greater than 12 cm from region of interest (ROI) in surrounding, in accordance with various embodiments of present disclosure.

As shown in FIG. 8, no object present at a distance longer than 12 cm may result in a smaller exposure angle α. Since, the number of light pulses scanning aperture 395 directly proportionate to the exposure angle α therefore, the number of light pulses scanning aperture 395 located at a distance greater than 12 cm also decreases. Moreover, the $AEL_{Average}$ may also be increased with the decrease in the number of light pulses scanning aperture 395. To this end, light pulses with larger amplitude (i.e. light pulses with increased energy/power) may be used to cover a longer range and hence improving SNR associated with the received beam 324, thereby improving the detectability of objects located at a longer distance.

Figure 9:
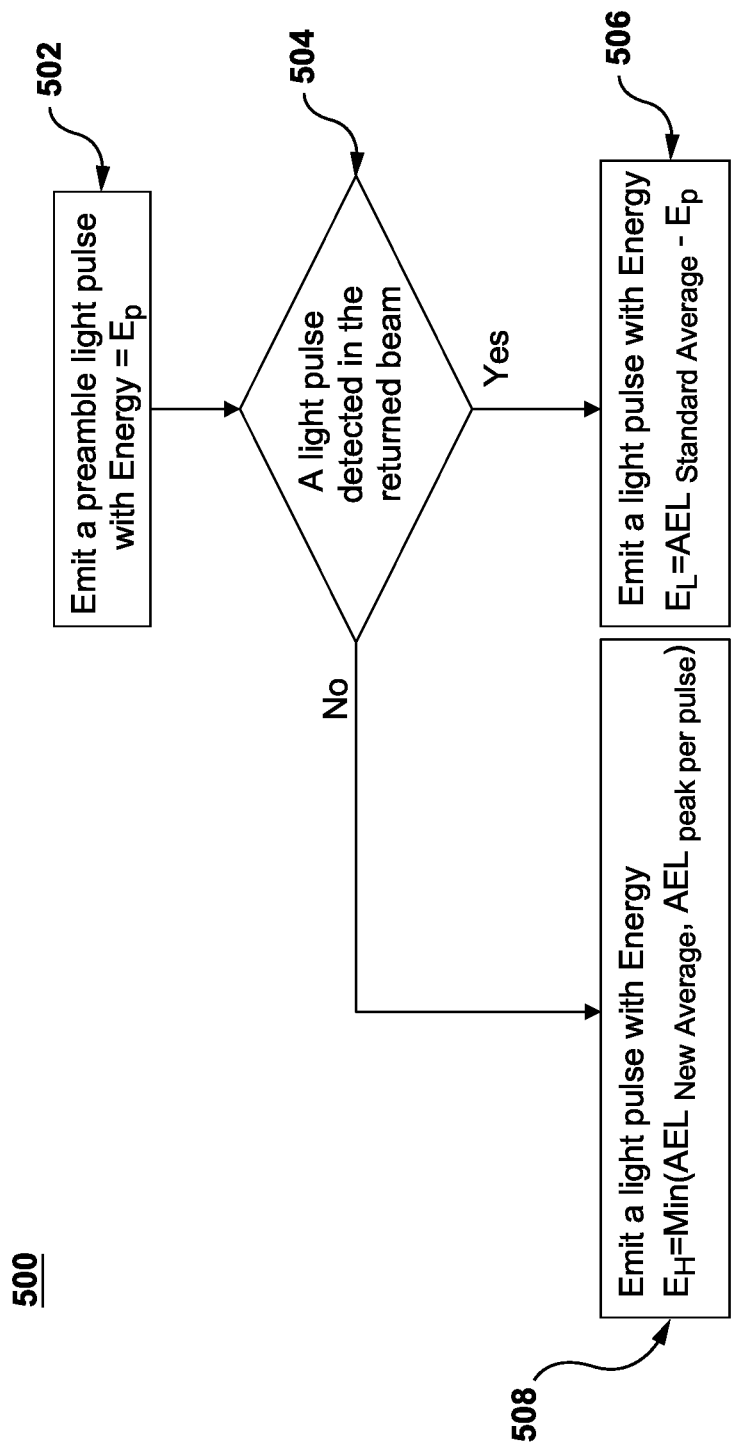
FIG. 9 depict a flowchart representing a process directed to a method implemented on the LiDAR system, in accordance with various embodiments of present disclosure.

With this said, FIG. 9 depicts a flowchart representing a process 500 directed to a method implemented on LiDAR system 310, in accordance with various embodiments of present disclosure.

As shown, process 500 begins at step 502. At step 502, light source component 312 generates a preamble light pulse and scanner component 316 transmits the preamble light pulse towards ROI 380. In certain embodiments, the operational characteristics of the preamble light pulse may be different from the operational characteristics of the scanning light pulses (e.g. those included in the group of light pulses 322-1) transmitted by LiDAR system 310. In one example, the preamble light pulse may have a width W of 2 ns and the associated pulse energy $E_p$=10 nJ (i.e. 5 W). It is to be noted that the above operational characteristics of the preamble light pulse is merely a non-limiting example, rather the preamble light pulse may have any other suitable operational characteristics without limiting the scope of present disclosure.

Process 500 advances to step 504. At step 504, controller component 320 waits for a predefined time period and after that verifies if the transmitted preamble light pulse is received by scanner component 316 or not. In case scanner component 316 receives the transmitted preamble light pulse, process 500 advances to step 506 else process 500 advances to step 508.

At step 506, controller component 320 determines that an object is being present in a close vicinity of LiDAR system 310 and computes a distance of the object from the LiDAR system 310 using equation (1). In certain embodiments, the detected object may or may not be a human being, in any case based on the computed distance to this end, controller component 320 may further compute $AEL_{standard\ Average}$ using tables as shown in FIGS. 6 and 7 and equation (4). It is to be noted that the detected object may be a human being. In order to transmit eye safe pulses, controller component 320 may instruct light source component 312 to generate next light pulse (also referred to scanning pulse herein) with energy $E_L=AEL_{standard\ Average}-E_p$, where $E_p$ is the energy associated with the transmitted preamble light pulse. Also, the energy $E_L$ is such that the emitted pulses are below the required safety level.

At step 508, since the transmitted preamble light pulse is not received by scanner component 316, controller component 320 determines that no object is present in a close vicinity of LiDAR system 310. That is a human being may not be present near LiDAR system 310. To this end, controller component 320 may compute $AEL_{New\ Average}$ using tables as shown in FIGS. 6 and 7 and equation (4). Controller component 320 may compare the $AEL_{New\ Average}$ with the $AEL_{peak\ per\ pulse}$. Whichever value is less, controller component 320 instruct light source component 312 to generate next light pulse with energy $E_H$=MIN ($AEL_{New\ Average}$, $AEL_{peak\ per\ pulse}$).

In so doing, the LiDAR system 310 may radiate pulses with increased energy level to further improve the SNR of LiDAR system 310, thereby improving the detectability of objects located at a longer distance. Further, in certain embodiments, in case the transmitted preamble light pulse is received after the scanning pulse, controller component 320 may omit the transmitted preamble light pulse for determining the objects in ROI 380.

Figure 10:
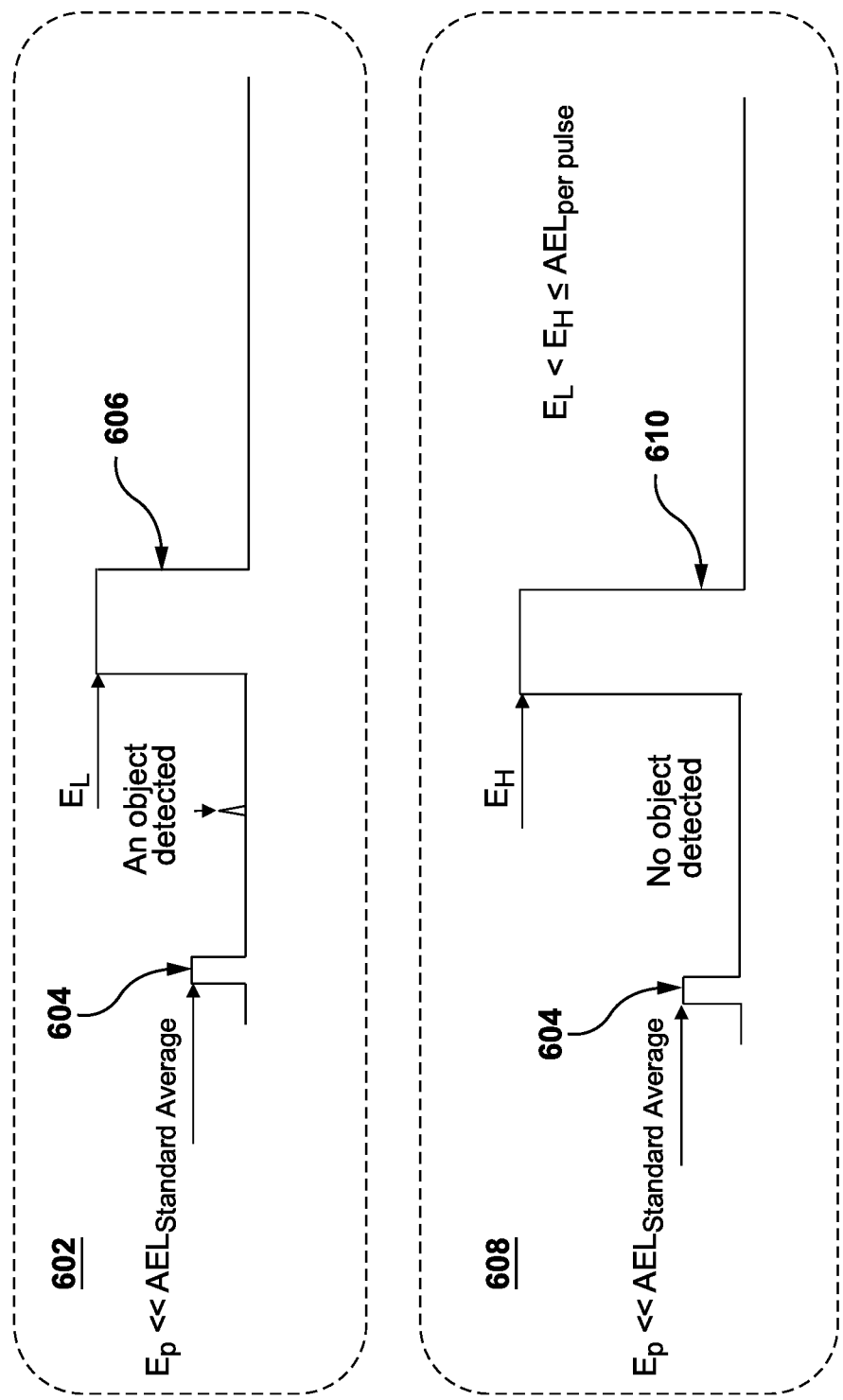
FIG. 10 illustrates two different scenarios for transmitting a preamble light pulse, in accordance with various embodiments of present disclosure.

FIG. 10 illustrates two different scenarios 602 and 604 for transmitting a preamble light pulse, in accordance with various embodiments of present disclosure. As shown in scenario 602, LiDAR system 310 may transmit a preamble light pulse 602 towards ROI 380. In certain embodiment, if preamble light pulse 604 is reflected from object 330, controller component 320 determines the presence of object 330 in close vicinity of LiDAR system 310. Since there are chances that the detected object may be an human being, in order to make LiDAR system eye safe, controller component 320 may instruct light source component 312 to generate next light pulse 606 with energy $E_L = \text{AEL}_{standard\ Average} - E_p$ (as discussed above in process 500).

In second scenario 608, LiDAR system 310 may transmit a preamble light pulse 602 towards ROI 380. In certain embodiment, controller component 320 may wait for certain duration for preamble light pulse 604 to be reflected. In case, preamble light pulse 604 is not reflected, controller component 320 determines that there may be no object present in the close vicinity of LiDAR system 310. In order to further improve the SNR of LiDAR system 310, controller component 320 make LiDAR system eye safe, controller component 320 may instruct light source component 312 to generate next light pulse 610 with energy $E_H = \text{MIN}(\text{AEL}_{New\ Average}, \text{AEL}_{peak\ per\ pulse})$, as discussed above in process 500. It is to be noted that the energy level of light pulses 604, 606, and 610 may follow the order $E_P \ll E_L < E_H < \text{AEL}_{peak\ per\ pulse}$.

It is to be noted that the number of light pulses N received by aperture 395 is given as:

$$N = \frac{\alpha}{\text{Horizontal Resolution}} = \frac{\tan^{-1}\left(\frac{7\ mm}{\text{preamble distance}}\right)}{\text{Horizontal Resolution}} \quad (6)$$

Figure 11:
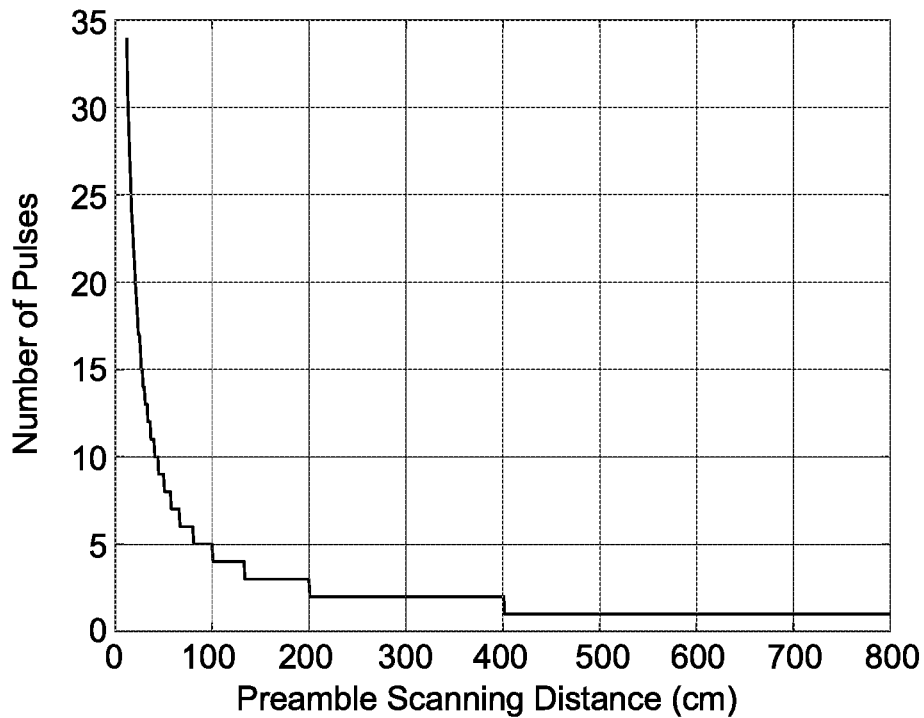
FIG. 11 illustrates the relationship of a number of light pulses N received by an aperture for various preamble distance values, in accordance with various embodiments of present disclosure.

In certain embodiments, the Horizontal resolution may be equals to 0.1°. Hence, for various values of preamble distance, i.e. distance of aperture 395 from the LiDAR system 310, the number of light pulses N received by aperture 395 may be estimated using equation (6). FIG. 11 illustrates the relationship of the number of light pulses N received by aperture 395 for various preamble distance values, in accordance with various embodiments of present disclosure. As shown, with increase in the preamble distance, the number of light pulses N received by aperture 395 decreases.

Figure 12:
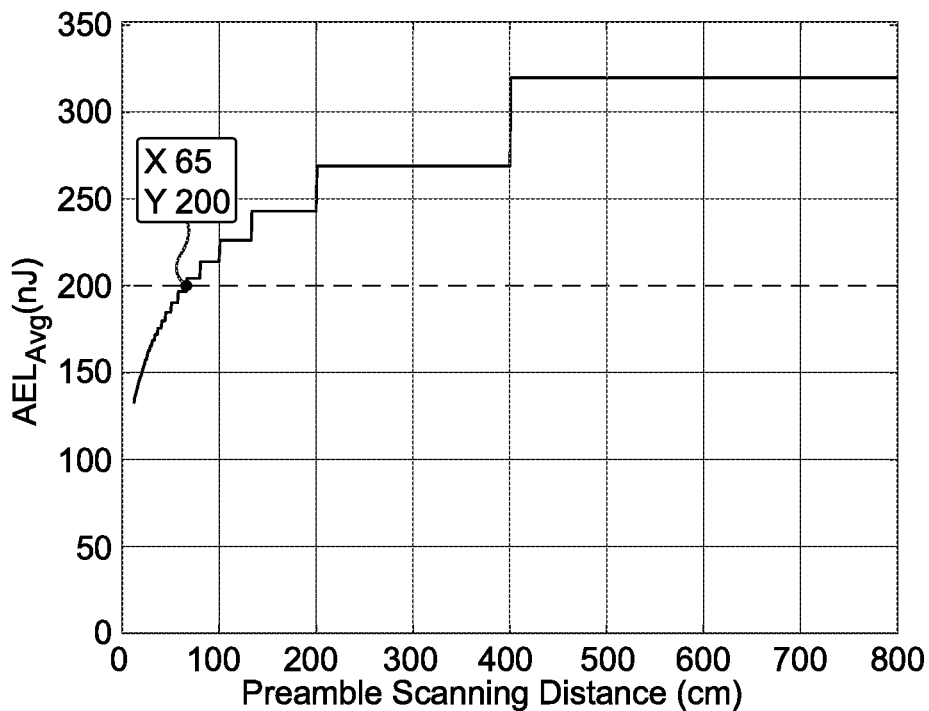
FIG. 12 illustrates a relationship between $AEL_{Average}$ and various preamble distance values, in accordance with various embodiments of present disclosure.

Also, using equation (4), FIG. 12 illustrates a relationship between $\text{AEL}_{Average}$ and various preamble distance values, in accordance with various embodiments of present disclosure. As shown, with increase in preamble distance value, $\text{AEL}_{Average}$ also increases. In one non-limiting example, as previously discussed, for a light pulse of 5 ns, wavelength 905 nm and repetition rate 100 kHz, the $\text{AEL}_{Total}$ is determined from table 400 (as shown in FIG. 6) using a total pulse of duration $$\frac{N}{\text{repetition rate}}\text{sec},$$

where N is calculated using equation (6). Although, as shown in FIG. 12, the preamble distance has been varied for different values, however, a light pulse of 5 ns pulse width may not exceed the $\text{AEL}_{peak\ per\ pulse} = 200$ nJ. To this end, the optimal preamble distance for a light pulse of 5 ns pulse width, wavelength 905 nm and repetition rate 100 kHz may be 65 cm.

The optimal preamble distance represents maximum distance that the preamble light pulse (e.g. 604) may travel before returning to the LIDAR system 310. In certain embodiments, the optimal preamble distance may be calculated based on the $\text{AEL}_{peak\ per\ pulse}$, the pulse width of the scanning pulses and the repetition frequency f of the scanning light pulses.

It is to be noted that the preamble light pulse (e.g. 604) must have enough energy to detect the objects located in the optimal preamble distance. Depending on the background noise, the preamble signal energy/power is determined to reach the minimum SNR (due the probable return from an object located at the calculated preamble distance) achieves a probability of detection equals to 1.

Figure 13:
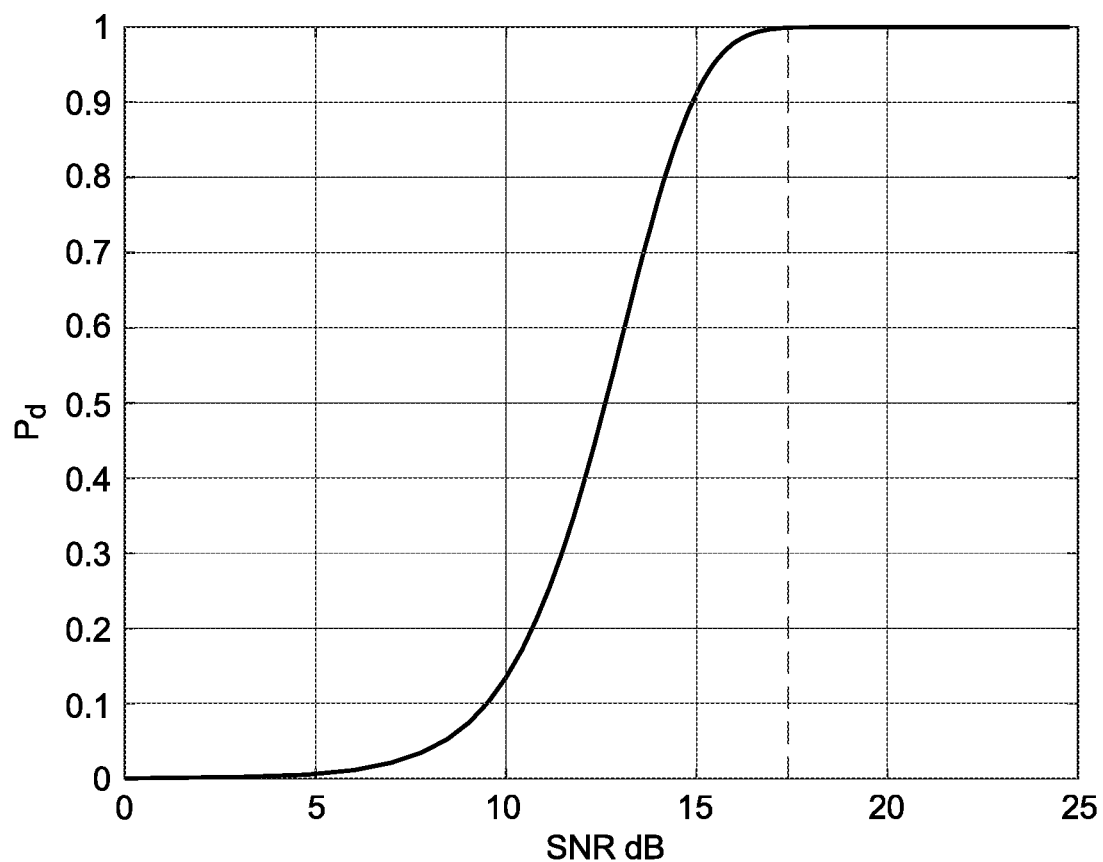
FIG. 13 illustrates a relationship between a probability of detection $P_d$ and SNR, in accordance with various embodiments of the present disclosure.

The minimum SNR can be estimated using the Neyman Pearson detector:

$$P_d = Q(Q^{-1}(P_{fa}) - \sqrt{SNR}) \quad (7)$$

where $P_{fa}$: probability of false alarm (set at constant ranging between $10^{-4}$ to $10^{-6}$) and Q: is Q-function. FIG. 13 illustrates a relationship between probability of detection $P_d$ and the SNR, in accordance with various embodiments of the present disclosure. As shown, in certain embodiments, for approximately 17.5 dB the probability of detection $P_d$ may be equal to 1.

Figure 14:
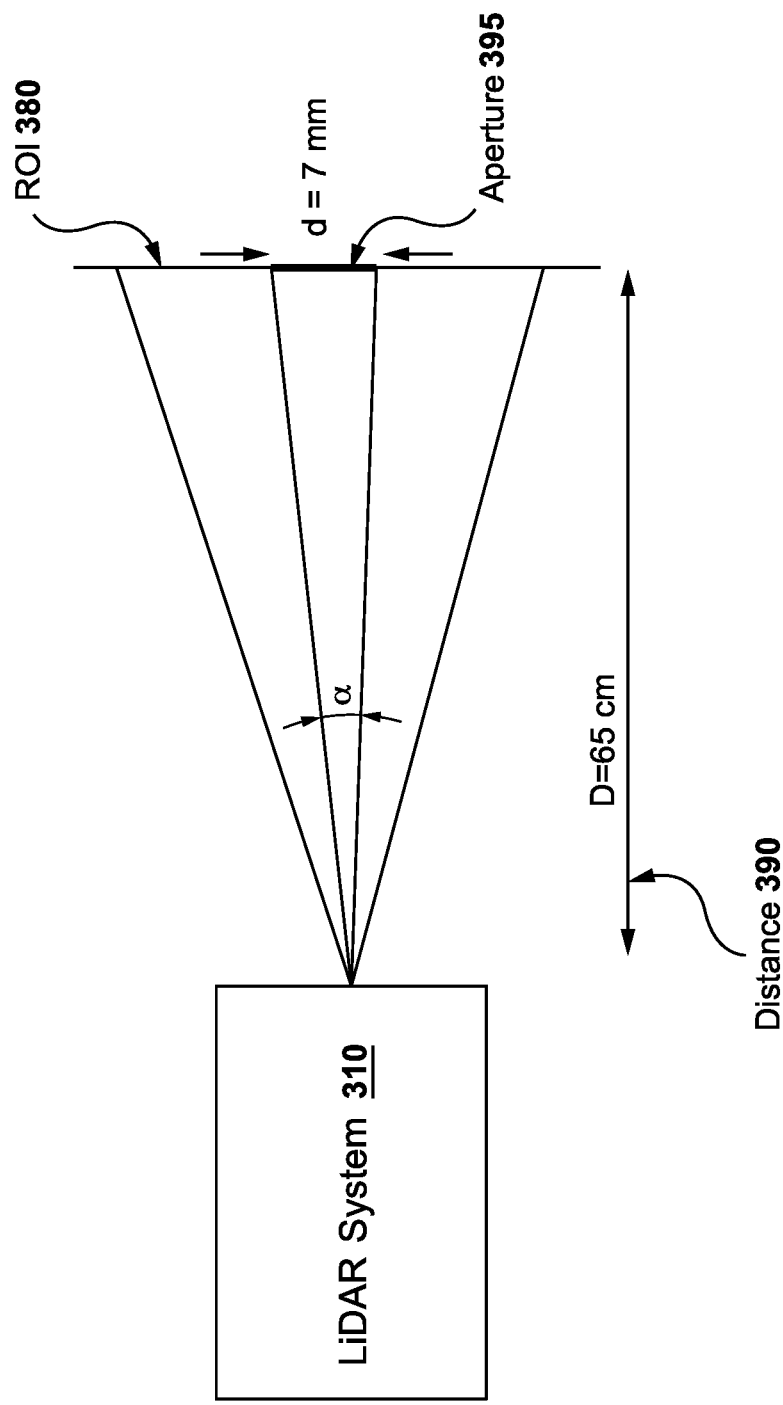
FIG. 14 illustrates a high-level functional block diagram of LiDAR system configured to transmit a preamble pulse followed by a light pulse having energy $E_L$ or $E_H$ in accordance with various embodiments of the present disclosure.

FIG. 14 illustrates a high-level functional block diagram of LiDAR system 310 configured to transmit a preamble pulse (e.g. 604) followed by a light pulse having energy $E_L$(e.g. 606) or $E_H$(e.g. 610), in accordance with various embodiments of the present disclosure. In certain embodiments, light source component 312 may be configured to generate a preamble light pulse (e.g. 604) and scanner component 316 may be configured to transmit the preamble light pulse (e.g. 604) towards ROI 380. In certain embodiments the preamble light pulse (e.g. 604) may have a pulse width of 2 ns and $E_p = 10$ nJ (i.e. 5 watt) to check if there is any object located in the optimal preamble distance (e.g. 65 cm). It is to be contemplated that to travel the optimal preamble distance (e.g. 65 cm) and return back to the LiDAR system 310, controller component 320 may compute the time-of-flight (TOF) using equation (1).

In one example, for the optimal preamble distance equals to 65 cm, TOF may be approximately equals to 4.33 ns, which is less than the repetition rate 10 μs (based on 100 KHz repetition frequency). In other words, LiDAR system 310 may be configured to transmit light pulses for every 10 μs. However, the first pulse may be the preamble light pulse (e.g. 604). As noted above, TOF of the preamble light pulse (e.g. 604) may depend on the optimal preamble distance which may be very less than the repetition rate of the light pulses. To this end, based on if the transmitted preamble light pulse (e.g. 604) is reflected back to LiDAR system 310 during the predefined time period, wherein the predefined time period may be based on the optimal preamble distance, light source component 312 may be configured to adjust the energy/power of the next light pulse to be transmitted.

In certain embodiments, such adjustments to the scanning light pulses may be computed by controller component 320 and controller component 320 may provide light source component 312 with the amount of adjustment required. For example, in certain embodiments, if an object is detected based on reflected preamble light pulse, controller component 320, may compute an energy $E_L$ as $E_L = AEL_{standard\ Average} - E_p$. The $AEL_{standard\ Average}$ may be computed based on equation (4). It is to be noted that the value of $AEL_{standard\ Average}$ may be based on assumption that aperture 395 may have a diameter of 7 mm and may be located at a distance of 12 cm from the LiDAR system 310. As previously calculated, the $AEL_{standard\ Average}$ may be equals to 133.5 nJ (26.7 W peak power). To this end, the computed energy $E_L$ may be equals to $E_L = 133.5 - 10 = 123.5$ nJ (24.7 W peak power). Light source component 312 may be configured to generate next light pulse having energy $E_L = 123.5$ nJ. This light pulse is then transmitted towards ROI 380.

In certain embodiments, if no object is detected, i.e. the transmitted preamble light pulse is not reflected back to LiDAR system 310, controller component 320, may compute an energy $E_H$ as $E_H = MIN(AEL_{New\ Average}, AEL_{peak\ per\ pulse})$. It noted from table 400 (FIG. 6) that the $AEL_{peak\ per\ pulse}$ for a light pulse having a width of 5 ns is 200 nJ (40 W peak power).

The $AEL_{New\ Average}$ may be computed using equation (4). However, to compute the $AEL_{New\ Average}$, the $AEL_{New\ Total}$ may be computed based on the exposure angle α calculated in accordance with the aperture 395 having a diameter of 7 mm and the preamble distance be equals to the optimal preamble distance, i.e. 65 cm in this case. The exposure angle α may be calculated as $$\tan^{-1}\left(\frac{7\ mm}{65\ cm}\right) = 0.6°.$$

Given the Horizontal resolution may be equals to 0.1°, the total number of light pulses N that may be received by aperture 395 may be equals to 0.6/0.01=6 pulses.

For repetition rate 10 μs (based on 100 KHz repetition frequency), total time period of 6 light pulses comes out to be 60 μs. Based on this total time of 60 μs and table 400 (FIG. 6), the $AEL_{NewTotal}$ is calculated as 1226.4 nJ and the corresponding $$AEL_{New\ Average} = \frac{1226.4}{6} = 204.4\ nJ.$$

However, the he $AEL_{peak\ per\ pulse}$ for a light pulse having a width of 5 ns is 200 nJ (40 W peak power). Hence, $E_H = MIN(AEL_{New\ Average}, AEL_{peak\ per\ pulse}) = 200$ nJ. Light source component 312 may be configured to generate next light pulse having energy $E_H = 200$ nJ. This light pulse is then transmitted towards ROI 380.

It is to be noted that in certain embodiments at one instant of time, LiDAR system emits either a preamble light pulse (e.g. 604) or a scanning light pulse (e.g. 606 or 610).

It is to be noted that in no way the above example limits the scope of present disclosure. For example, in various embodiments, the light pulse may have different operational characteristics in terms of pulse width, frequency, and repetition rate than as defined other. In any case, $AEL_{Total}$, $AEL_{Average}$, $AEL_{peak\ per\ peak}$, optimal preamble distance, preamble pulse energy or any such parameters may be computed based on operational characteristics of the light pulses generated and emitted by the LiDAR system 310.

Further, in certain embodiments, for a given operational characteristics of light pulses, the values of the energy $E_L$ or $E_H$ may be predefined in the memory (e.g. 130) associated with the LiDAR system 310. Controller component 320 may be configured to directly access these values based on if an object is detected by the preamble light pulse (e.g. 604) or not. Also, in certain embodiments, light source component 312 may include a pulse driver (not depicted) to change the intensity light pulses.

Thus by virtue of transmitting a preamble light pulse with low energy/power level followed by light pulses having energy/power level $E_L$ or $E_H$ improves the overall efficiency of LiDAR system 310. For example, in case no object is detected by the preamble light pulse (e.g. 604), the $AEL_{average}$ of the scanning light pulse (e.g. 610) may be extended to the $AEL_{peak\ per\ pulse}$. In certain embodiments, for specific operational characteristics of the light pulse, the $AEL_{average}$ may be 133.5 nJ which may be extended to the $AEL_{peak\ per\ pulse}$ having value of 200 nJ. Therefore, there may be increase of around 49.8% in allowed energy. In so doing, referring to equation (3), the maximum scanning range for such light pulses may also be increased by 22.4% of the original scanning range for the same object intensity.

In another example, in case an object is detected by the preamble light pulse (e.g. 604), the energy of next light pulse may be equals to 123.5 nJ which is a decrease in around 7.5%. In so doing, referring to equation (3), the maximum scanning range for such light pulses may also be decreased by 4% of the original scanning range for the same object intensity.

In case of detecting an object within the optimal preamble distance, the maximum scanning range may be slightly decreased due to dissipation of some energy in the preamble light pulse. However, this effect can be ignored since an object has been detected within a very short distance from the LiDAR system 310.

Further, due to using different pulse widths for the preamble light pulse and the scanning light pulses, the return of the preamble light pulses after emitting the scanning light pulse can easily be omitted and eliminating the possibility to falsely detecting the preamble light pulse in the echo of the scanning light pulses.

Figure 15:
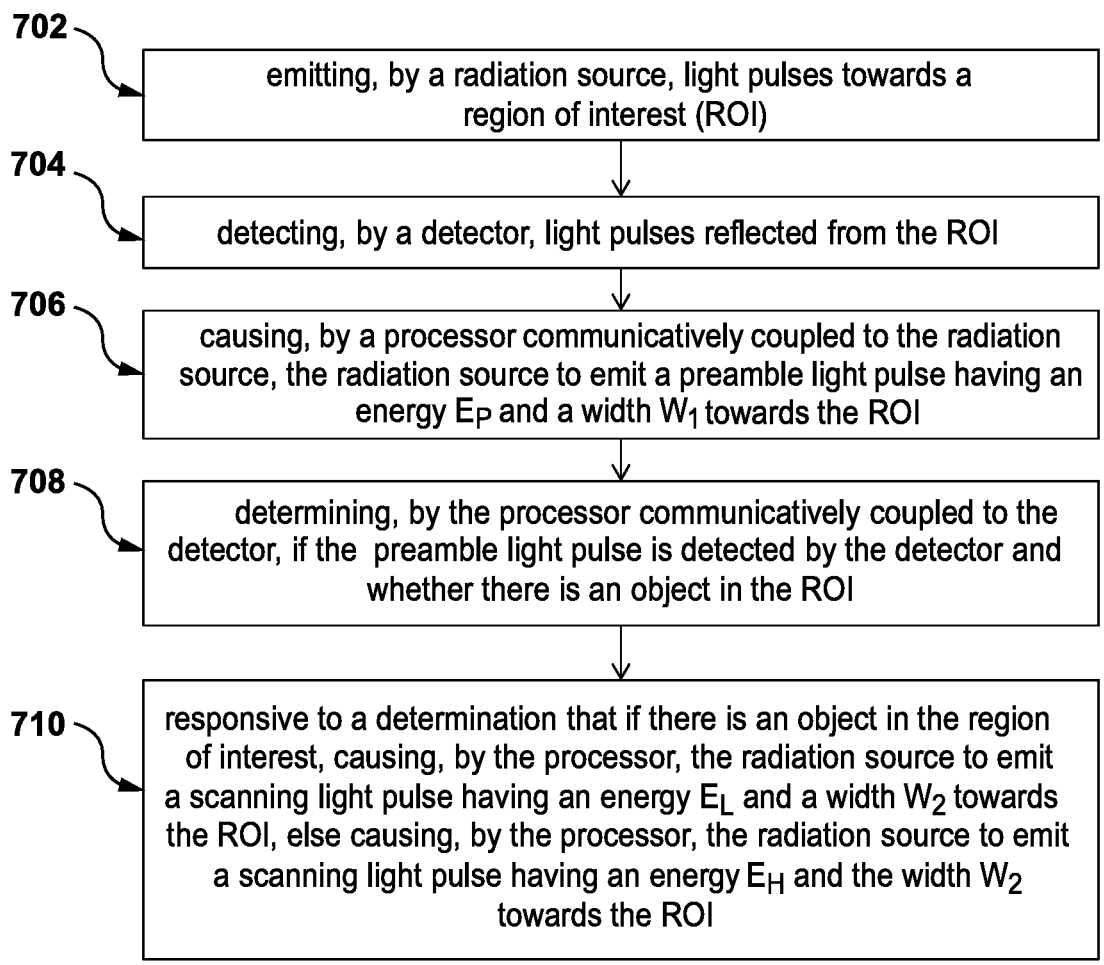
FIG. 15 depicts flowcharts representing processes directed to a method implemented on LiDAR system system, in accordance with various embodiments of present disclosure.

FIG. 15 depicts flowcharts representing processes 700 directed to a method implemented on LiDAR system 310, in accordance with various embodiments of present disclosure.

As shown, process 700 begins at step 702 where a radiation source emits light pulses towards region of interest (ROI). As discussed above, light source component 312 generates light pulses and in certain scanner component 316 may direct the generated light pulses towards ROI 380.

Process proceeds to step 704 where a detector detects light pulses reflected from the ROI. As previously noted receiver component 318 receives or detects photons from reflected light pulses and generates one or more representative data signals. For example, receiver component 318 may generate an output electrical signal that is representative of reflected light pulses. Receiver component 318 may also provide the so-generated electrical signal to controller component 320 for further processing.

Process advances to step 706 where a processor communicatively coupled to the radiation source cause the radiation source to emit a preamble light pulse having an energy $E_P$ and a width $W_1$ towards the ROI. As previously discussed, controller component 320 coupled to light source component 312 instructs to emit a preamble light pulse (e.g. 604). In one example, the energy $E_P$ associated with the preamble light pulse (e.g. 604) is 10 nJ and width of the pulse is 2 ns.

Process moves to step 708 where the processor communicatively coupled to the detector determines if the preamble light pulse is detected by the detector and whether there is an object in the ROI. As noted above, controller component 320 coupled to receiver component 318 determines if the preamble light pulse (e.g 604) is detected by receiver component 318 and if there is an object present in ROI 380.

Finally at step 710 responsive to a determination that if there is an object in the ROI, causing, by the processor, the radiation source to emit a scanning light pulse having an energy $E_L$ and a width $W_2$ towards the ROI, else causing, by the processor, the radiation source to emit a scanning light pulse having an energy $E_H$ and the width $W_2$ towards the ROI. As previously discussed, responsive to a determination that if there is an object in the ROI 380, controller component 320 cause light source component 312 to emit a scanning pulse having an energy $E_L$ (e.g. 125.5 nJ) and having a pulse width of $W_2$ (e.g. 5 ns). Else, if no object is detected in the ROI 380, controller component 320 cause light source component 312 to emit a scanning pulse having an energy $E_H$ (e.g. 200 nJ) and having a pulse width of $W_2$ (e.g. 5 ns).

Thus by virtue of LiDAR system 310 and process 700, SNR to determine objects located at a longer distance may be achieved in a cost effective and an efficient manner without adding much hardware complexity.

It is to be understood that the operations and functionality of LiDAR system 310, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A LiDAR system comprising:
a radiation source configured to emit light pulses towards a region of interest (ROI);
a detector configured to detect light pulses reflected from the ROI;
a processor, communicatively coupled to the radiation source and the detector, the processor configured to:
cause the radiation source to emit a preamble light pulse having an energy $E_P$ and a pulse width $W_1$ towards the ROI;
determine, if the preamble light pulse is detected by the detector and whether there is an object in the ROI;
responsive to a determination that there is an object in the ROI, cause the radiation source to emit a scanning light pulse having an energy $E_L$ and a pulse width $W_2$ towards the ROI;
responsive to the determination that there is no object in the ROI, cause the radiation source to emit a scanning light pulse having an energy $E_H$ and the pulse width $W_2$ towards the ROI; and
wait for a predetermined duration to determine if the preamble light pulse is detected by the detector, the predetermined duration being calculated based on a preamble distance, the preamble distance being calculated based on a Peak Admissible Exposure Limit ($AEL_{peak\ per\ pulse}$), the width $W_2$, and a repetition frequency f of the light pulses.

2. The LiDAR system of claim 1, wherein the energy $E_p$ is less than the energy $E_L$, the energy $E_L$ is less than the energy $E_H$ and the energy $E_H$ is less than or equal to the $AEL_{peak\ per\ pulse}$.

3. The LiDAR system of claim 1, wherein the energy $E_L$=Standard Admissible Exposure Limit ($AEL_{standard\ Average}$)−$E_P$.

4. The LiDAR system of claim 1, wherein the energy $E_H$ is equal to the smaller value of New Admissible Exposure Limit ($AEL_{New\ Average}$) or Peak Admissible Exposure Limit ($AEL_{peak\ per\ pulse}$).

5. The LiDAR system of claim 1, wherein the pulse width $W_1$ is smaller than the pulse width $W_2$.

6. The LiDAR system of claim 1, further comprises omitting the preamble light pulse received after the predetermined duration.

7. The LiDAR system of claim 1, wherein the energy $E_P$ is calculated based on a minimum estimated signal-to-noise ratio (SNR).

8. The LiDAR system of claim 7, wherein the minimum SNR is estimated through a Neyman Pearson detector.

9. A LiDAR method comprising:
emitting, by a radiation source, light pulses towards a region of interest (ROI);
detecting, by a detector, light pulses reflected from the ROI;
causing, by a processor communicatively coupled to the radiation source, the radiation source to emit a preamble light pulse having an energy $E_P$ and a pulse width $W_1$ towards the ROI;
determining, by the processor communicatively coupled to the detector, if the preamble light pulse is detected by the detector and whether there is an object in the ROI;
responsive to a determination that if there is an object in the ROI, causing, by the processor, the radiation source to emit a scanning light pulse having an energy $E_L$ and a pulse width $W_2$ towards the ROI;
responsive to the determination that if there is no object in the ROI, causing, by the processor, the radiation source to emit a scanning light pulse having an energy $E_H$ and the pulse width $W_2$ towards the ROI; and
waiting for a predetermined duration to determine if the preamble light pulse is detected by the detector, the predetermined duration being calculated based on a preamble distance, the preamble distance being calculated based on a Peak Admissible Exposure Limit ($AEL_{peak\ per\ pulse}$), the width $W_2$, and a repetition frequency f of the light pulses.

10. The LiDAR method of claim 9, wherein the energy $E_p$ is less than the energy $E_L$, the energy $E_L$ is less than the energy $E_H$ and the energy $E_H$ is less than or equal to the $AEL_{peak\ per\ pulse}$.

11. The LiDAR method of claim 9, wherein the energy $E_L$=Standard Admissible Exposure Limit ($AEL_{standard\ Average}$)−$E_P$.

12. The LiDAR method of claim 9, wherein the energy $E_H$ is equal to the smaller value of New Admissible Exposure Limit ($AEL_{New\ Average}$) or Peak Admissible Exposure Limit ($AEL_{peak\ per\ pulse}$)).

13. The LiDAR method of claim 9, wherein the pulse width $W_1$ is smaller than the pulse width $W_2$.

14. The LiDAR method of claim 9, further comprises omitting the preamble light pulse received after the predetermined duration.

15. The LiDAR method of claim 9, wherein the energy $E_P$ is calculated based on a minimum estimated signal-to-noise ratio (SNR).

16. The LiDAR method of claim 15, wherein the minimum SNR is estimated through a Neyman Pearson detector.

* * * * *